US012162174B2

(12) United States Patent
Skrobis et al.

(10) Patent No.: US 12,162,174 B2
(45) Date of Patent: Dec. 10, 2024

(54) RAZORS AND RAZOR CARTRIDGES

(71) Applicant: The Gillette Company LLC, Boston, MA (US)

(72) Inventors: Kenneth James Skrobis, Maynard, MA (US); John Lawrence Maziarz, Framingham, MA (US); Joseph Allan DePuydt, Salem, NH (US); William Owen Jolley, Spencer, MA (US)

(73) Assignee: The Gillette Company LLC, Boston, MA (US)

(*) Notice: Subject to any disclaimer, the term of this patent is extended or adjusted under 35 U.S.C. 154(b) by 559 days.

(21) Appl. No.: 16/942,923

(22) Filed: Jul. 30, 2020

(65) Prior Publication Data

US 2021/0031390 A1 Feb. 4, 2021

Related U.S. Application Data

(60) Provisional application No. 62/881,193, filed on Jul. 31, 2019.

(51) Int. Cl.

*B26B 21/40* (2006.01)
*B26B 21/14* (2006.01)
*B26B 21/56* (2006.01)

(52) U.S. Cl.

CPC .......... *B26B 21/4031* (2013.01); *B26B 21/14* (2013.01); *B26B 21/56* (2013.01)

(58) Field of Classification Search

None

See application file for complete search history.

(56) References Cited

U.S. PATENT DOCUMENTS 2,137,817 A 11/1938 Arthur
2,703,451 A 3/1955 Struve et al.
3,664,884 A 5/1972 Underwood
4,981,756 A 1/1991 Rhandhawa
5,388,331 A 2/1995 Doroodian-Shoja
5,630,275 A * 5/1997 Wexler .................... B26B 21/54 30/346.54
7,284,461 B2 10/2007 Skrobis et al.
7,448,135 B2 11/2008 Zhuk et al.

(Continued)

FOREIGN PATENT DOCUMENTS

EP 3 599 066 B1 * 6/2021
JP 2005261544 A 9/2005

(Continued)

OTHER PUBLICATIONS

International Search Report and Written Opinion; Application Ser. No. PCT/US2020/070327; dated Nov. 10, 2020, 12 pages.

(Continued)

*Primary Examiner* — Hwei-Siu C Payer
(74) *Attorney, Agent, or Firm* — Andres E. Velarde; Joanne N. Pappas; Kevin C. Johnson

(57) ABSTRACT

A razor cartridge having a first blade proximal to a front of the cartridge and having one or more first coatings disposed thereon, a second blade proximal to a back of the cartridge, the second blade having one or more second coatings disposed thereon, wherein a thickness of at least one of the one or more first coatings disposed on the first blade is less than a thickness of at least one of the one or more second coatings disposed on the second blade.

17 Claims, 28 Drawing Sheets

(56) References Cited

U.S. PATENT DOCUMENTS

| | | | |
|---|---|---|---|
| 7,673,541 B2 | 3/2010 | Skrobis et al. | |
| 7,739,797 B2 | 6/2010 | Rawle | |
| 9,248,579 B2 | 2/2016 | Depuydt et al. | |
| 10,960,559 B2 * | 3/2021 | Kim, II | B26B 21/4031 |
| 2002/0000041 A1 | 1/2002 | Doroodian-Shoja | |
| 2005/0268470 A1 | 12/2005 | Skrobis et al. | |
| 2006/0130612 A1 | 6/2006 | Skrobis et al. | |
| 2007/0062047 A1 | 3/2007 | Zhuk | |
| 2007/0131060 A1 | 6/2007 | Kelsey et al. | |
| 2010/0011590 A1 * | 1/2010 | DePuydt | B26B 21/00 30/50 |
| 2010/0011595 A1 | 1/2010 | Claus et al. | |
| 2010/0122464 A1 | 5/2010 | Ndou et al. | |
| 2010/0299931 A1 | 12/2010 | Marchev et al. | |
| 2011/0126413 A1 | 6/2011 | Szczepanowski et al. | |
| 2011/0139649 A1 | 6/2011 | Marcinkowski | |
| 2014/0026424 A1 | 1/2014 | Oglesby et al. | |
| 2015/0328789 A1 * | 11/2015 | Skrobis | B26B 21/60 30/346.54 |
| 2016/0167242 A1 | 6/2016 | Noh et al. | |
| 2018/0043561 A1 * | 2/2018 | Nisby | B05D 7/50 |
| 2018/0079095 A1 | 3/2018 | Robertson et al. | |
| 2018/0162000 A1 * | 6/2018 | Duff, Jr. | B26B 21/60 |
| 2018/0264669 A1 | 9/2018 | Howell | |
| 2020/0156273 A1 | 5/2020 | Fitzgerald | |
| 2021/0031388 A1 * | 2/2021 | Xu | B26B 21/565 |
| 2021/0031390 A1 * | 2/2021 | Skrobis | B26B 21/00 |
| 2023/0166417 A1 * | 6/2023 | Lee | B26B 21/4031 30/50 |

FOREIGN PATENT DOCUMENTS

| | | | |
|---|---|---|---|
| JP | 2017536947 | A | 12/2017 |
| JP | 2019527604 | A | 10/2019 |
| JP | 2020014837 | A | 1/2020 |
| RU | 2004117619 | A | 1/2006 |
| WO | 2005120783 | A1 | 12/2005 |
| WO | 2007110848 | A1 | 10/2007 |
| WO | 2010008981 | A1 | 1/2010 |

OTHER PUBLICATIONS

All Office Actions, U.S. Appl. No. 16/942,955.

All Office Actions: U.S. Appl. No. 18/533,340, filed on Dec. 8, 2023.

Unpublished U.S. Appl. No. 18/533,340, filed on Dec. 8, 2023, Laura Xu et al.

* cited by examiner

INDIVIDUAL BLADE LOADING AS A
PERCENTAGE OF TOTAL CARTRIDGE LOAD

RAZORS AND RAZOR CARTRIDGES

FIELD OF THE INVENTION

This invention relates to razors and more particularly to razor cartridges and even more particularly to the razor blades and their coatings in the razor cartridges.

BACKGROUND OF THE INVENTION

In shaving, it is desirable to achieve a close shave, while also providing a comfortable experience during hair removal. It is desirable to provide a razor cartridge having a plurality of razor blades contained therein each of which has a sharpened edge. The sharpened edge is comprised of a substrate and one or more coatings deposited thereon which engage(s) the hair and provides shaving comfort. It has been found that even when using blades with coated sharpened edges, intended to provide both a close shave and good comfort, the overall shaving experience can still be uncomfortable to some users.

It is desirable to provide a razor cartridge having blades with coated sharpened edges that improve shaving comfort while not compromising on closeness or other shaving attributes.

SUMMARY OF THE INVENTION

A razor cartridge for a razor is provided. The razor cartridge comprises a guard, a cap, and at least two blades with parallel sharpened edges located between the guard and cap. A first blade defines a blade edge nearest to the guard and a second blade defines a blade edge nearest to the cap. The present invention also contemplates that the first blade is not the nearest to the guard but defines a blade nearer or closer to the guard than the second blade and also that the second blade is nearer or closer to the cap than the first blade is. In the present invention, the first blade has one or more coatings with a thickness less than the coating thickness of the second blade. The present invention also contemplates that in razor blades having multiple coatings, just one coating varies in thickness between the first and second blades. The present invention contemplates that the hard coating of the first blade is less thick than the hard coating of the second blade.

In a first embodiment, the present invention is directed to a razor cartridge comprising a first blade proximal to a front of the cartridge, the first blade having one or more first coatings disposed thereon, a second blade proximal to a back of the cartridge, the second blade having one or more second coatings disposed thereon, wherein a thickness of at least one of the one or more first coatings disposed on the first blade is less than a thickness of at least one of the one or more second coatings disposed on the second blade. The at least one of the one or more first coatings is a first hard coating and the at least one of the one or more second coatings is a second hard coating. The front of the cartridge comprises a guard area and the back of the cartridge comprises a cap area. The first razor blade is adjacent to the guard area. The second razor blade is adjacent to the cap structure. At least one of the one or more second coatings is at least two times as thick as the at least one of the one or more first coatings. The first hard coating ranges in thickness from about 150 Angstroms to about 1800 Angstroms. The second hard coating ranges in thickness from about 500 Angstroms to about 3500 Angstroms.

In another embodiment, the present invention is directed to a razor cartridge comprising a first razor blade having a first hard coating, a second razor blade having a second hard coating, the first blade disposed closer to a guard area of the razor cartridge than the second blade and the second blade disposed closer to a cap area of the razor cartridge than the first blade, wherein the second hard coating has a second thickness that is greater than a first thickness of the first hard coating.

The first hard coating or the second hard coating comprises a carbon containing material, chromium containing material, niobium containing material, boron containing material, titanium containing material, or any combination thereof. The first razor blade is adjacent to the guard area. The second razor blade is adjacent to the cap area. The razor cartridge further includes at least one third razor blade having at least one third hard coating, the at least one third razor blade disposed between the first and the second razor blade. At least one of the at least one third hard coating is substantially the same as the first hard coating. At least one of the at least one third hard coating is substantially the same as the second hard coating. The second hard coating is at least two times as thick as the first hard coating. A thickness of the first hard coating ranges in thickness less than about 800 Angstroms and a thickness of the second hard coating is greater than about 800 Angstroms. A ratio of the second thickness to the first thickness is about 1.5 to about 4.5. The first blade has one or more coatings of a thickness at least about 2.75 times less than the thickness of the second blade.

In another embodiment, a razor cartridge is provided comprising a plurality of razor blades disposed within the cartridge from a front area to a back area of the razor cartridge, each of the blades comprising a coating, wherein a thickness of the coatings increases from the front area to the back area.

In yet another embodiment, a razor cartridge is provided with coated razor blades, one of said coated razor blades disposed closer to a guard area of said cartridge and having a coating thickness that is lowest of all coating thicknesses of said coated razor blades in said cartridge.

Where a razor has multiple blades, one or more blades can be designed with coatings having reduced thicknesses while other blades can be designed to have thicker coating(s). This combination of different blades having differing coating thicknesses provides a shave having improved comfort while maintaining closeness.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings.

DETAILED DESCRIPTION OF THE INVENTION

Figure 1:
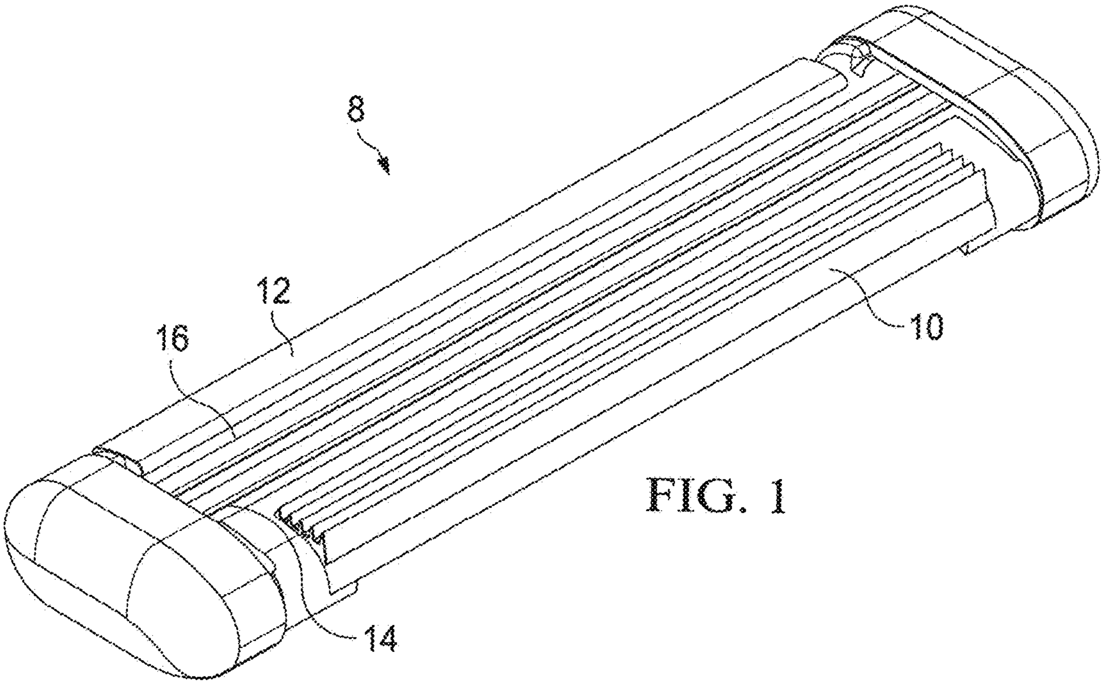
FIGS. 1-4 depict razor cartridges having multiple blades where one or more blades have relatively thicker coatings than at least one other blade positioned in the razor.

In the prior art even when using blades with coated sharpened edges, intended to provide both a close shave and good comfort, the overall shaving experience can still be uncomfortable to some users. The prior art includes commercially available razor cartridges, all of which have razor blades in each position of the razor cartridges such that each of the blade coatings on each blade in prior art razor cartridges are the same. It was realized surprisingly that having such an arrangement presents disadvantages, for instance, in shaving comfort, during shave strokes. It was discovered that while each blade is in a different position in the razor cartridge, each position engages the skin and hair differently.

For instance, in a position closer to the front of the cartridge or near or nearest the guard area, the blade or blades (e.g., primary blades or primary blade edges) are required to achieve a substantial amount of the cutting action as the bulk of the hair cutting is achieved by this blade or blades and most of the long hairs are cut by this blade or blades. In turn, this blade or blades near the front of the cartridge comprise minimal skin-management properties.

The blade or blades toward the back of the cartridge or near or nearest the cap area will be required to engage and cut remaining hairs (e.g., clean up) and will comprise substantial skin-management properties and as such will have blade edges with less propensity to engage the skin than those at the front of the cartridge, but will encourage gliding over the skin without nicking, cutting, or scraping the skin. This will reduce the likelihood of post-shave irritation and improves the comfort during and after shaving. These blade edges also may have higher strength and durability.

The blade or blades in the middle, a "third blade" or "third blades" as referred to herein, may vary between functioning similarly to those blades in front and those in back of the cartridge. In a razor cartridge with five blades, there are generally five slots or five positions, one for each blade. The first blade is generally disposed in the first slot nearest the guard and the second blade is generally disposed in the fifth slot nearest the cap, while the three third blades are generally disposed in the second, third, and fourth slots in between the first and fifth slots.

In a shaving stroke, hair and skin typically travels from the front of the cartridge to the back of the cartridge. The pressure is the force normal to the skin per unit area. This pressure (force per unit area) of each blade edge on the skin and hair can be different from a blade edge in the first position (in the front of the cartridge or guard area) to a blade edge in the last position (in the back of the cartridge or cap area). For instance, generally the pressure on a first blade is low and the pressure on the last blade in the razor cartridge is high. With this increasing blade to skin pressure realized from the first blade to the last blade, each shaving stroke with a razor cartridge having sharp blades can provide discomfort during shaving.

Unexpectedly, it has been determined that the comfort of a shave can be optimized if one or more of the coatings on the razor blades in a razor cartridge are different. The differences of the coatings of the present invention can comprise differences in overall coating thickness (e.g., all hard coating thicknesses taken together), different thicknesses of individual coating layers, and/or differences in type of materials utilized, whether between just two blades or across all blades within a razor cartridge.

Specifically, it has been determined that by increasing or decreasing a coating thickness of the blade edge, of even just one coating, in a deliberate manner based on position in the razor cartridge, skin management is greatly improved while the likelihood of skin engagement, which results in a scraping feel, nicks, cuts, and irritation is greatly reduced. Most razor blades have both hard and soft coatings disposed thereon. Even if only the hard coating thickness between two blades in particular positions is varied, this result is realized. Most preferably in the present invention, increasing the thicknesses of one or more of the coatings of the blade edges disposed towards the back of the cartridge (e.g., cap area) and/or reducing the thicknesses of one or more of the coatings of the blade edges disposed towards the front of the cartridge (e.g., guard area), shaving comfort is improved and closeness of the shave is not compromised.

In a razor cartridge of the present invention comprising a guard, a cap, and at least two blades with parallel sharpened edges located between the guard and cap, a "first blade" defines a blade edge nearest and a "second blade" defines a blade edge nearest to the cap. It should be noted that the present invention also contemplates that the first blade is not the nearest to the guard but defines a blade edge nearer or closer to the guard than the second blade and that the second blade is nearer or closer to the cap than the first blade.

Germane to the present invention, the first blade comprises one or more coatings and the second blade comprises one or more coatings wherein one or more coatings of the first blade have a thickness that is less than the thickness of the one or more coatings of the second blade.

The present invention also contemplates that in razor blades having multiple coatings, just one coating can vary in thickness, or two or more coatings can vary in thickness, between the first and second blades. Though any one or more of the multiple coatings may be varied in thickness, the present invention contemplates that one coating that may be varied may be the one or more layers of hard coating of both the first blade and the second blade such that the hard coating of the first blade has a thickness less than (e.g., thinner) that of the hard coating of the second blade, whether the hard coating is of the same type or not.

"Stress" as used herein is a force per unit area in a solid material resisting separation, compacting, or sliding, that tends to be induced by external forces. The solid material contemplated in the present invention is a substrate such as the skin or the skin surface.

"Pressure" as used herein, is defined as a type of stress exerted uniformly in all directions and its measure is also the force per unit area.

The term "blade load" as used herein signifies the force applied by an individual blade onto a substrate such as the skin. The stress on the skin resulting from the blade tip's contact on the skin is often referred to as "tip stress."

A "hard" coating as used herein signifies a non-lubricious coating. Hard coatings contemplated in the present invention can be comprised from one or more of amorphous, fine-, micro-, or nano-crystalline materials which may or may not comprise carbon, carbon containing materials such as diamond, amorphous diamond, nano-crystalline, or diamond like carbon or DLC, nitrides (e.g., boron nitride, niobium nitride, chromium nitride, zirconium nitride, or titanium nitride), carbides (e.g., silicon carbide), chromium containing materials, boron containing materials, titanium containing materials, oxides (e.g., alumina, zirconia), metal or metal alloys (e.g., chromium, chromium platinum, titanium), or other ceramic materials (including nanolayers or nanocomposites), mixtures thereof, or stacking of multiple "hard" coatings. Any of the materials can be doped with other elements, such as tungsten, titanium, silver or chromium by including these additives, for example in the target during application by sputtering. The materials can also incorporate hydrogen, e.g., hydrogenated DLC. Thus, a hard coating of the present invention can be comprised of a carbon containing material, a chromium containing material, a boron containing material, a titanium containing material, or mixtures thereof, nitrides of Ti, Al, Zn, Cr, or mixtures thereof, including but not limited to, TiN, TiCN, TiAlN, ZrN, TiCN, and CrN.

A "layer" as used herein signifies at least one material on the blade edges satisfied by a variety of factors, including but not limited to, the composition, morphology or structure of the layer(s), the presence of a boundary between layers, whether the process used to make the product is expected to result in one or more layers, and whether there is a sufficient change in composition or morphology as to result in one or more layers. For instance, a change in density, stress state, or crystalline structure results in a substantially different layer. As such, while there may be only one type of material or composition disposed on a blade edge, there could be distinguishable layers if there is a change in the morphology of the material. This would section the material into layers, each layer having a different morphology. For instance, one layer may be more dense, more crystalline, or more columnar than another layer, despite being made of the same material.

A "coating" is often used interchangeably with "layer." As used herein a "coating" can signify one or more layers of materials on a blade edge. Thus, the present invention "coating" may be defined by a single layer, such as a hard coating type layer, or similarly, multiple layers as multiple coatings. Most razors have at least one hard coating and at least one soft coating disposed on a blade edge. The present invention also contemplates the term "coating" to signify the "overall" or total coating which includes all the layers of hard coating materials disposed on a blade edge. Thus, while a finished blade edge may include a soft coating, for purposes of the present invention, the "overall" coating is generally meant to comprise only the hard coating layers and not any soft coating layers.

Figure 23:
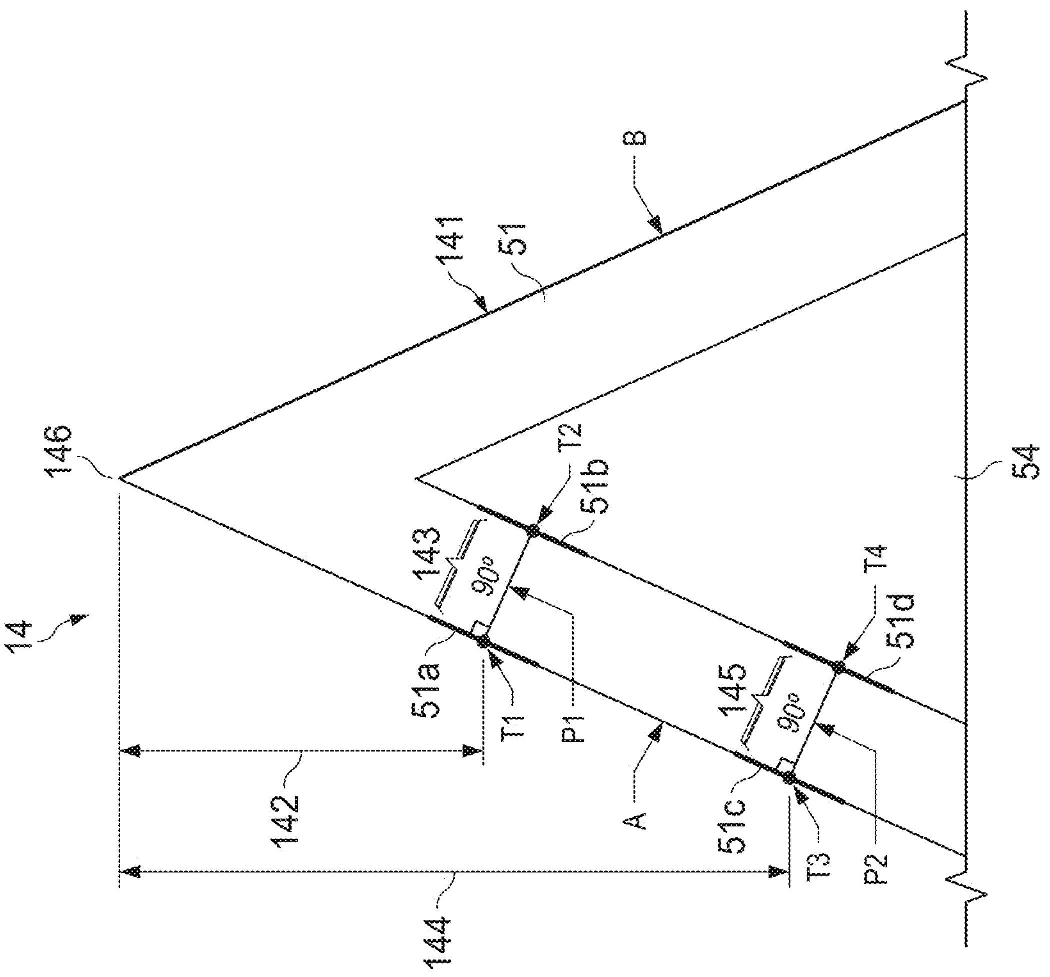
FIG. 23 is a diagrammatic cross-sectional view illustrating a first blade depicting thickness with an overall hard coating.
Figure 24:
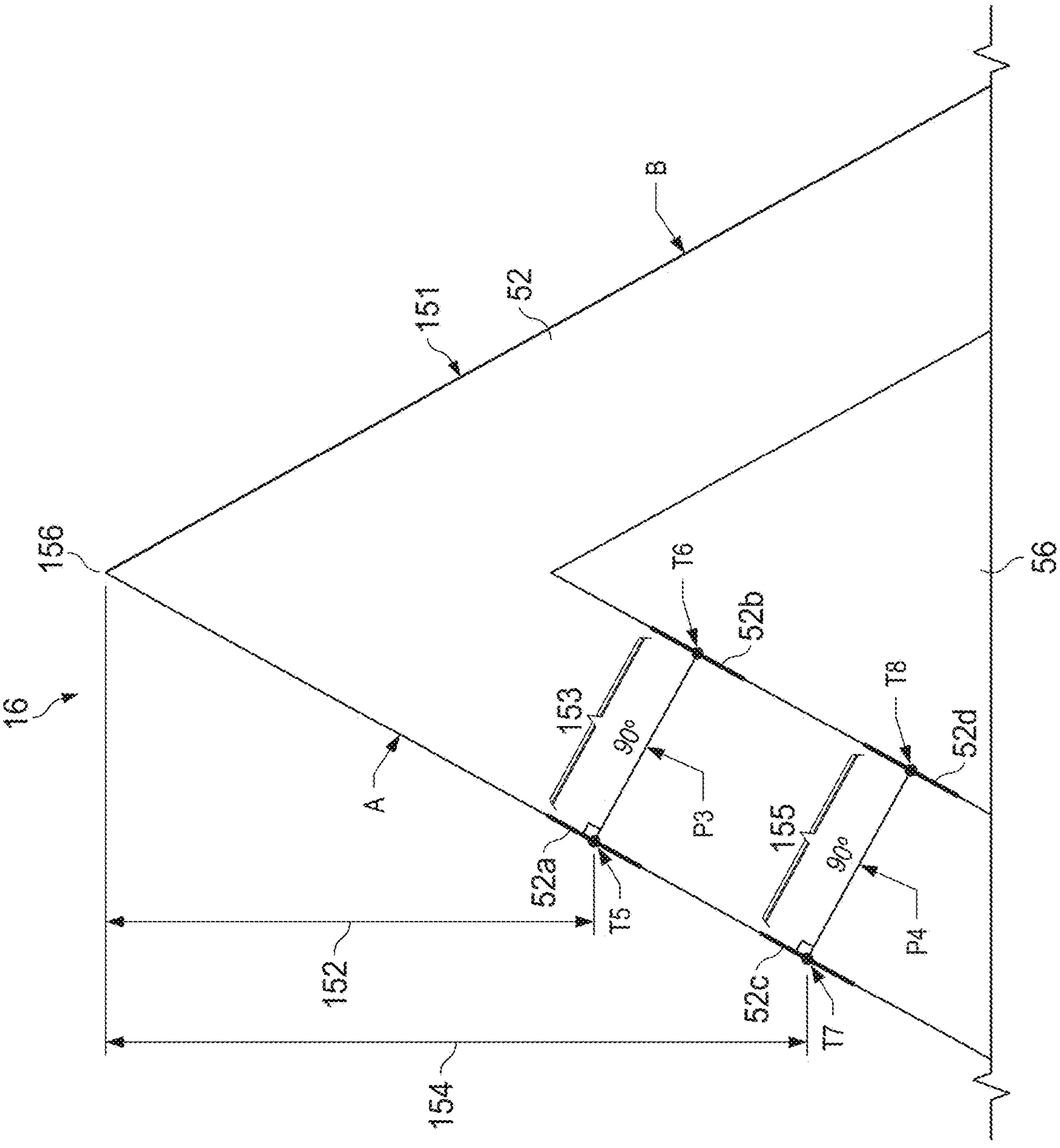
FIG. 24 is a diagrammatic view illustrating a second blade depicting thickness with an overall hard coating.

The "thickness" of the coating as the term is used herein generally signifies the width dimension of a particular material or materials. For a blade edge coating, a Scanning Electron Microscope (SEM) is used to visualize the thickness and obtain reasonable thicknesses over the blade edge or edge region (e.g., ranging from the ultimate tip to about 40 micrometers or more back from the tip). The thickness value at a distance from the ultimate tip is generally determined by the orthogonal distance along an orthogonal line from a point on the tangent line to the exterior surface of the hard coating at the distance from the tip to a point on a tangent line on the coating interface with the substrate. Effectively, the perpendicular distance across the coating between an exterior coating tangent line and a coating-substrate interface tangent line represents the thickness value at distance. FIG. 23 and FIG. 24 depict thicknesses of the hard coatings of the present invention at various distances from the ultimate tip.

While stainless-steel is the desired substrate of the razor blade of the present invention, as it is the common substrate for razor blades, blade substrates comprised of another metal or metals, ceramic, composite, plastic, glass, or any combination thereof, are also contemplated in the present invention. One substrate material which may facilitate producing an appropriately sharpened edge is a martensitic stainless-steel with smaller more finely distributed carbides. This type of steel may have similar overall carbon weight percent. A fine carbide substrate provides for a harder and more brittle after-hardening substrates, and enables the making of a thinner, stronger edge. An example of such a substrate material is a martensitic stainless-steel with a finer average carbide size with a carbide density of 90, 100, 200, 300, 400 carbides per 100 square micrometers, to 600, 800, 1000 carbides or more per 100 square micrometers as determined by Scanning Electron Microscopy, SEM 4000× or higher.

The term "about" as used herein generally signifies approximately or around. When a range of numerals are given, e.g., "about 4 to about 40" is disclosed herein, the present invention contemplates +/−10 percent of each number. Thus, for clarity, if a reference is described as being "about 4 to about 40" signifies the range of "3.6 to 44" as being encompassed by the present invention since the range of 3.6 to 4.4 represents +/−10 percent of 4 and the range of 36 to 44 represents +/−10 percent of 40.

Referring to FIG. 1, a razor cartridge 8 includes a guard 10, a cap 12, and two blades 14 and 16. The first blade 14 has a coating that is thinner than the thickness of the coating of the second blade 16 and as shown, the first blade 14 is positioned between the guard 10 and the second blade 16. Thus, when the razor cartridge 8 is in use, the first blade 14 will contact the hair before the second blade 16.

As used herein in both the text and the figures the term "first blade" refers to a blade having relatively thinner coating(s) or thinner hard coating(s), which requires a lower pressure on the first blade so that the skin is not negatively impacted than the blade referred to as the second blade. The first blade has good hair engagement and efficiency but does not sacrifice safety and comfort. Likewise, the term "second blade" refers to a blade having a relatively thicker coating or coatings, or thicker hard coating(s), which allows for greater pressure (i.e., force divided by area) on the second blade without negatively impacting the skin than the blade referred to as the first blade.

Figure 2:
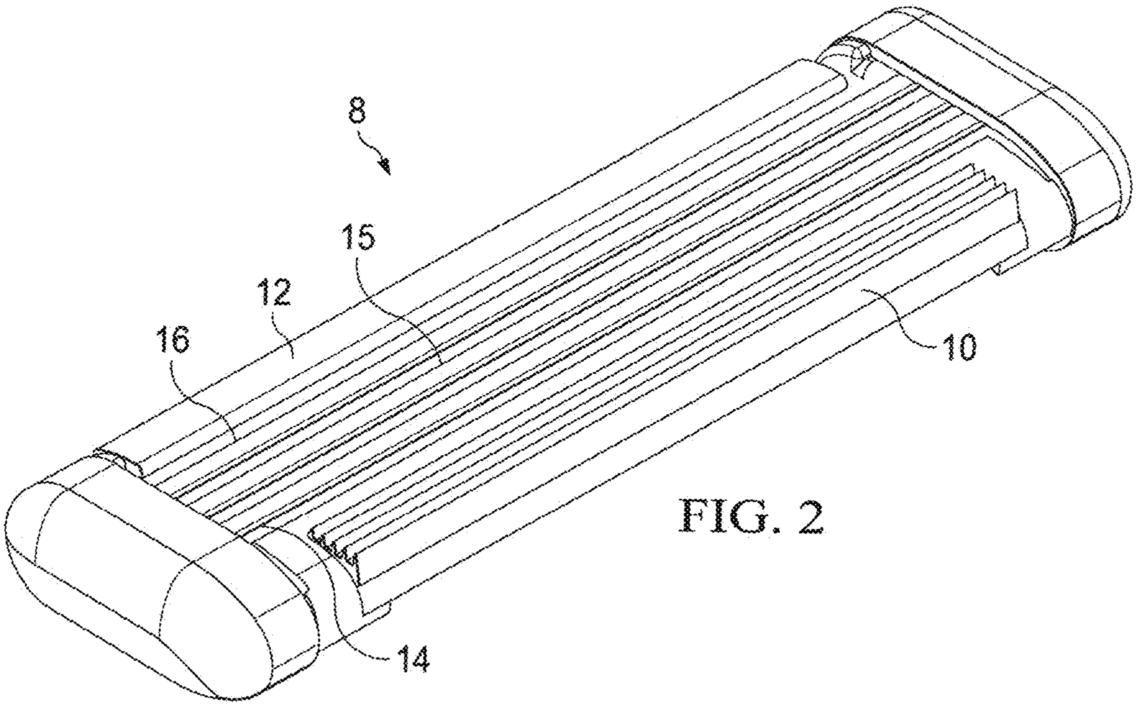
Figure 3:
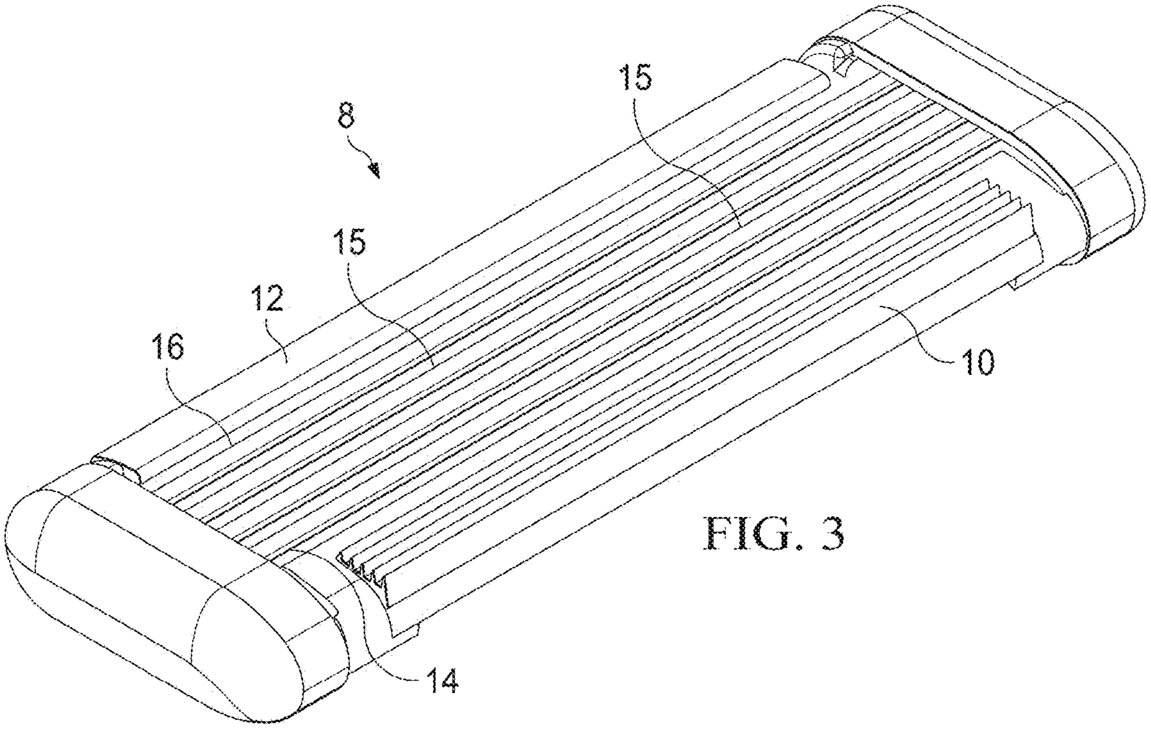
Figure 4:
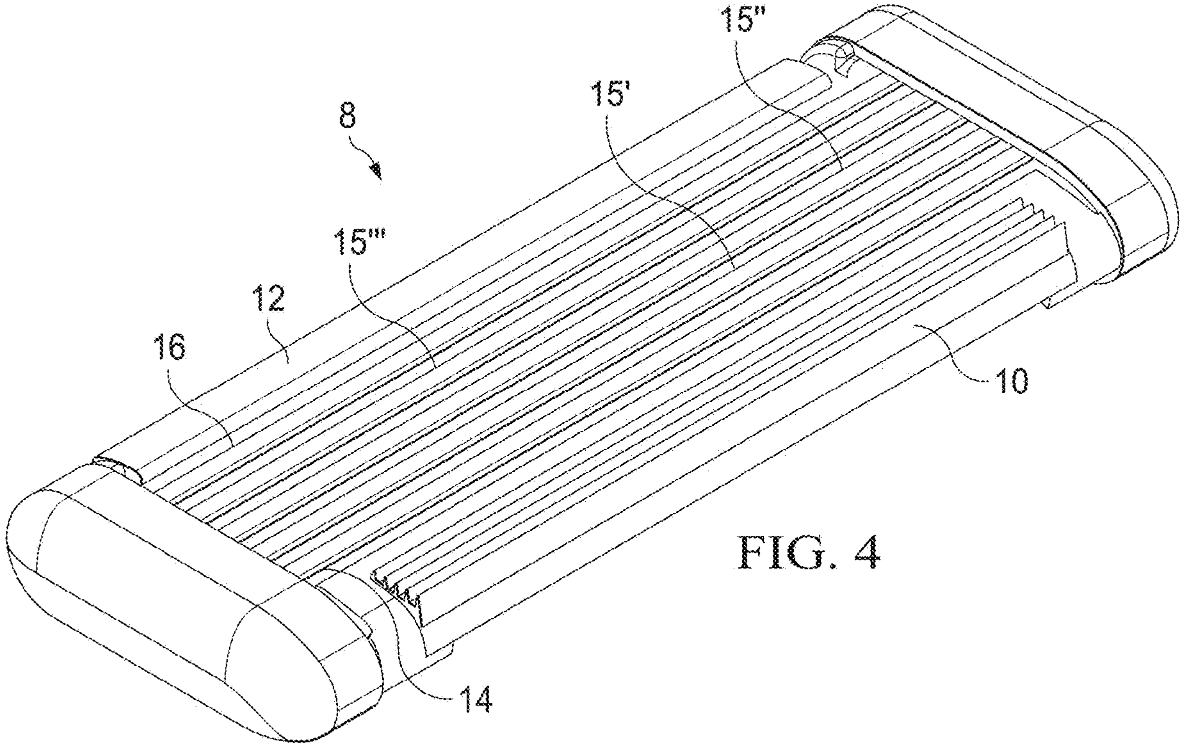

Referring to FIGS. 2-4, other razor cartridges can include a guard 10, a cap 12, and multiple blades 14, 15, 16 (three, four, five or more blades respectively). In each instance a first blade 14 having thinner coating(s) than a second blade 16 which is positioned between a guard 10 and the cap 12. As noted above, the second blade is the blade generally nearest or nearer to the cap 12 than the first blade.

As depicted in FIG. 2, the razor cartridge 8 has three blades. The first blade 14 is the blade with the thinner coating(s) and positioned closest or adjacent to the guard 10 (i.e., in the principal position). The second blade 16 having the thicker coating(s) is positioned in the third position from the guard 10, i.e., in the position nearest or adjacent the cap 12. A third blade 15 is positioned between the first blade 14 and the second blade 16. The third blade 15 may be identical to the first blade 14, identical to the second blade 16, or have a configuration different from the first blade 14 and the second blade 16. Preferably, the third blade 15 is identical to the first blade 14.

As depicted in FIG. 3, the razor cartridge 8 can include four blades. The first blade 14 is the blade with thinner coating(s) and positioned closest to the guard 10 (i.e., the principal position). The second blade 16 having thicker coating(s) is positioned in the fourth position from the guard 10, i.e., in the position nearest the cap 12. Two third blades 15 are positioned between the first blade 14 and the second blade 16. The third blades 15 may be identical to the first blade 14, identical to the second blade 16, or have a configuration different from the first blade 14 and the second blade 16. Preferably, the third blades 15 are each identical to the first blade 14 though any configuration is contemplated as long as a first blade has a coating thickness less than a second blade.

Figure 19:
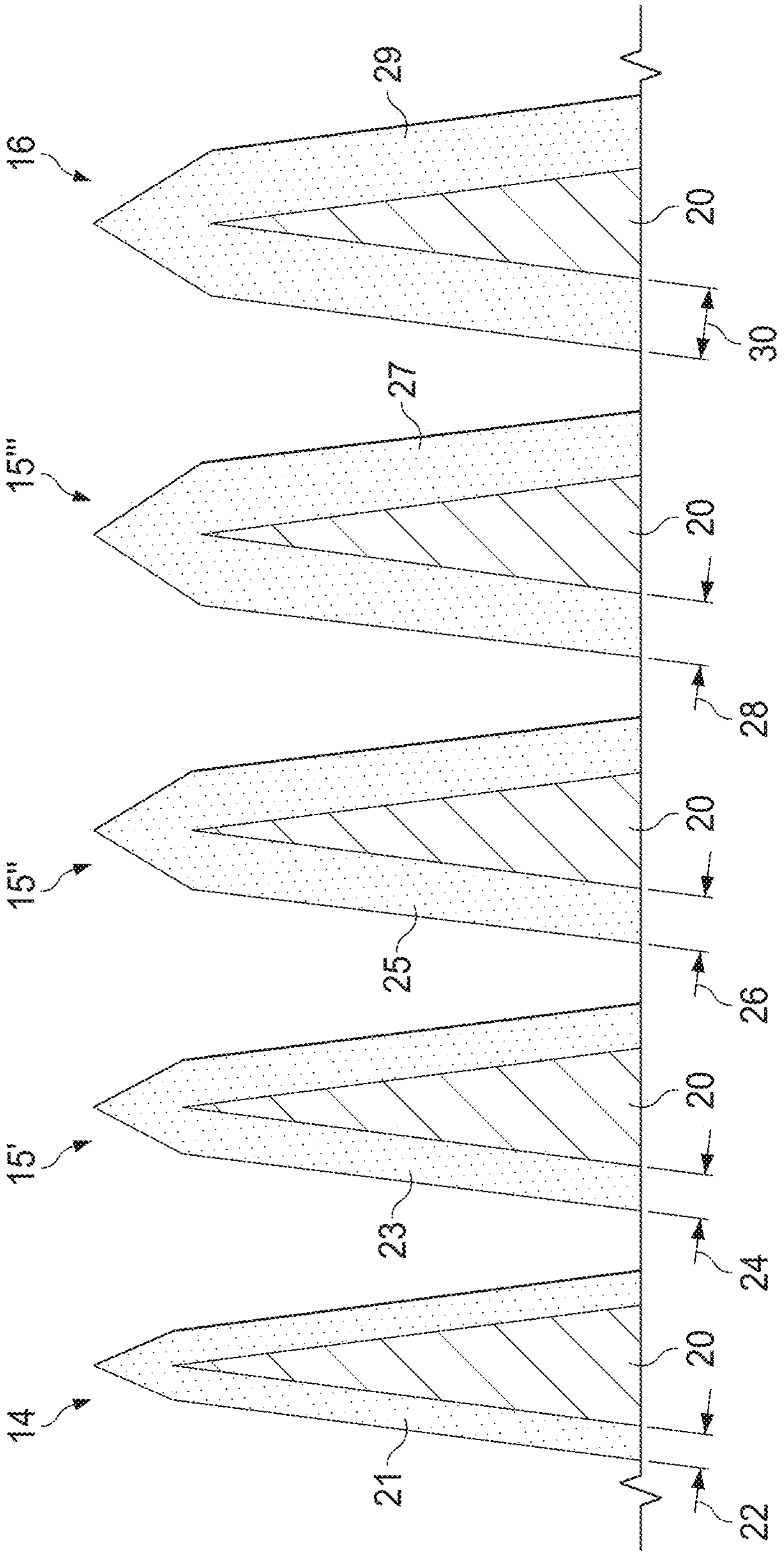

As depicted in FIG. 4, the razor cartridge 8 has five blades. The first blade 14 is the blade having thinner coating(s) and positioned closest to the guard 10 (i.e., the principal position). The second blade 16 having thicker coating(s) is positioned in the fifth position from the guard 10, i.e., in the position nearest the cap 12. Three third blades 15 (15', 15'', and 15''') are positioned between the first blade 14 and the second blade 16. The third blades 15', 15'', and 15''' may be identical to the first blade 14, identical to the second blade 16, have a coating thickness different from the first blade 14 and the second blade 16, or have any number of different coating thicknesses amongst themselves. Further, each blade may have a different coating thickness relative to other blade coating thicknesses in the razor cartridge, as depicted in FIG. 19.

Figure 5:
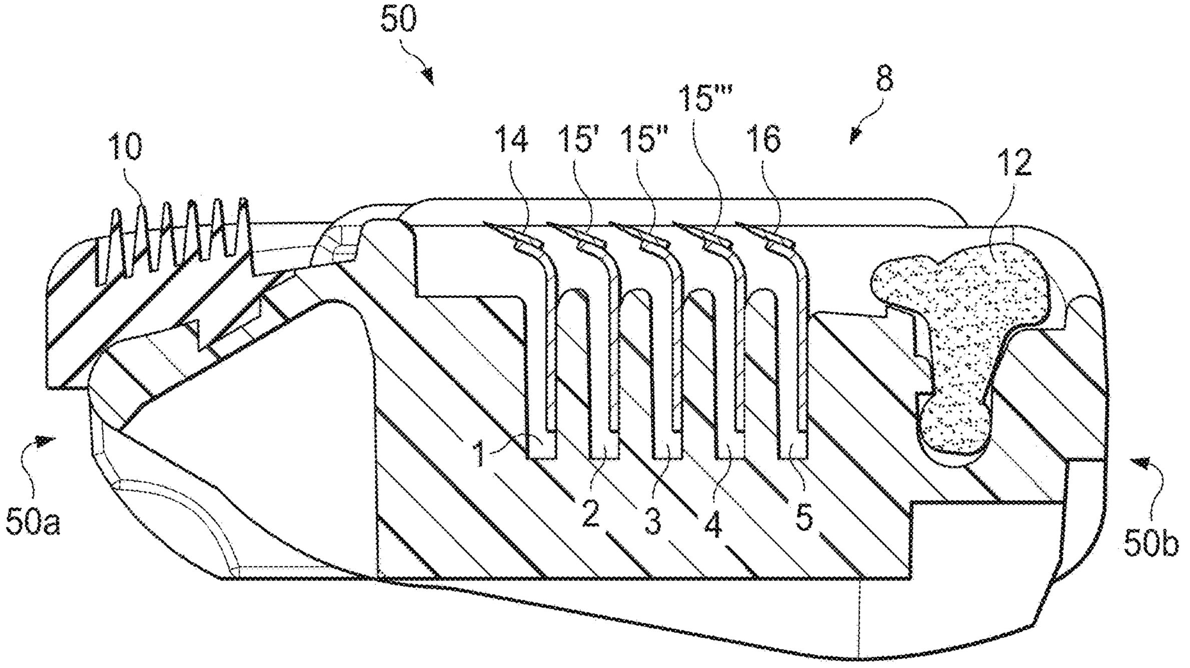
FIG. 5 is a cross-sectional view of an actual razor cartridge as shown in the embodiment of FIG. 4 having first, second, and third blades.

FIG. 5 shows a cross-sectional image 50 of an actual razor cartridge 8 of the embodiment depicted in FIG. 4 taken at a substantial midpoint of the cartridge. As can be seen, first blade 14 is disposed in a first position or blade slot 1 proximal to the guard structure 10 towards the front of the cartridge 50*a*, the second blade 16 is disposed in position or blade slot 5 proximal to the cap structure 12 towards the back of the cartridge 50*b*, and third blades 15 are in the middle section of slots, namely blades slots or positions 2, 3, and 4.

Figure 6:
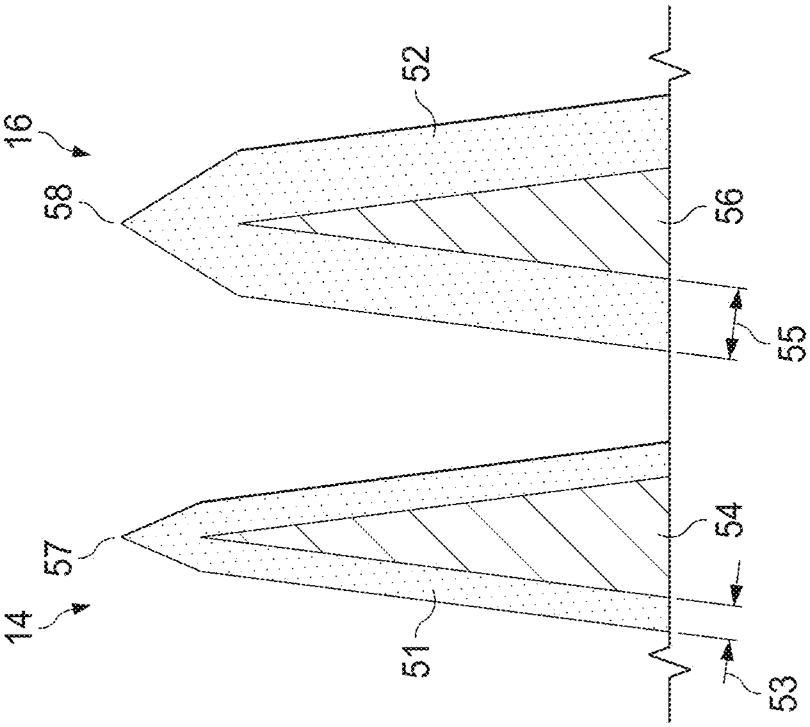
FIG. 6 is a diagrammatic cross-sectional view illustrating a first and second blade of the razor cartridges of the present invention (e.g., FIGS. 1-4).

An illustrative diagram of a cross-section of representative blades of the present invention is shown in FIG. 6. A first blade 14 of the present invention is shown in FIG. 6 depicting a substrate 54 and a first hard coating 51 deposited thereon. Hard coating 51 has an overall thickness 53. Coating thickness 51 is determined at a location of about four to about forty micrometers from the coated blade tip 57. Coating 51 may be comprised of one or more layers of the same or different materials, structures, or morphology. For instance, FIG. 20, as described in detail below, depicts a finished first blade edge having both hard and soft coatings and with an overall coating 51*a* (e.g., inclusive of the soft coating material) and with the hard coating 51 comprising several types of materials layered to form the thickness 53 of the hard coating 51. These individual layers may each be of varying thicknesses.

A representative second blade 16 of the present invention is also shown in FIG. 6 having a substrate 56 and a hard coating 52 deposited thereon. Hard coating 52 may be comprised of one or more layers of the same or different materials, structures, or morphology. Coating 52 has an overall thickness 55 determined at a location of about 4 micrometers to about 40 micrometers from the tip 58 of the second blade 16. The coating thickness 53 of the first blade is less than the coating thickness 55 of the second blade. As shown, coating 52 is thicker than coating 51. As with the first blade coating 51, coating 52 may be comprised of one or more layers of the same or different materials, structures, or morphology. For instance, FIG. 21, as described in detail below, depicts a finished second blade edge having both hard and soft coatings and with an overall coating 52*a* (e.g., inclusive of the soft coating material) and a hard coating 52 comprising several types of materials layered to form the overall thickness 55 of the hard coating 52. These individual layers may each be of varying thicknesses. The various types of layers of the first and second blade coatings will be further described in conjunction with FIGS. 20, 21, 21*a*, and 22 below.

Figure 7:
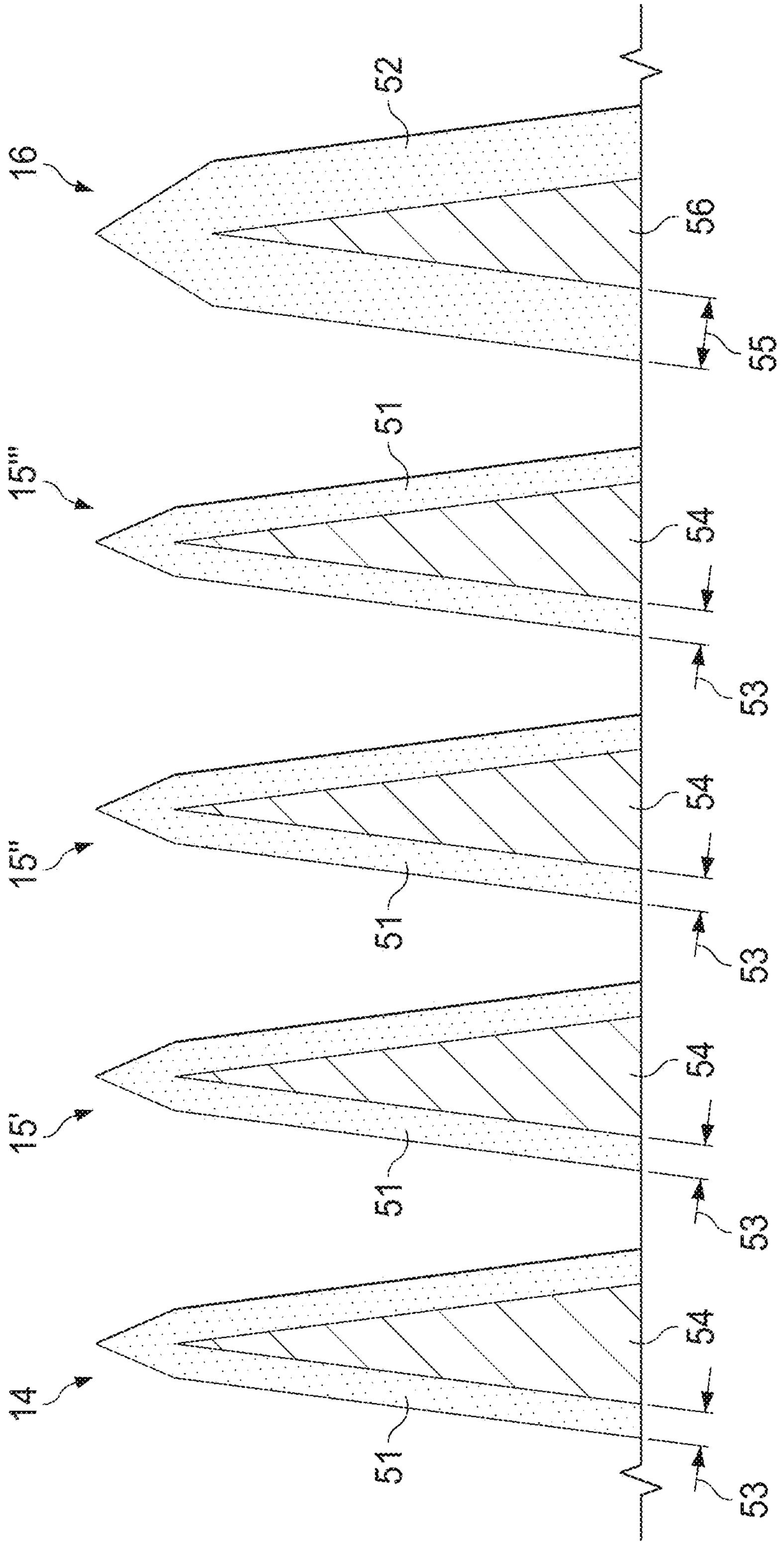
FIGS. 7-19 depict diagrammatic cross-sectional views illustrating arrangements of relative thicknesses of razor blade coatings of razor blades in razor cartridges of the present invention.

In embodiments of FIG. 7-19 all references to coating thicknesses are for hard coating thicknesses. In one embodiment of the present invention, the third blades 15 (15', 15'', and 15''') of FIG. 4 are each identical to the first blade 14. Specifically, the thickness of the coatings of the third blades 15 are each identical to the coating thickness of the first blade 14. FIG. 7 depicts such an illustration of cross-sectional views of portions of the blade edges within the razor cartridge 8 showing coatings 51, 52 on each blade 14, 16, and substrates 54, 56, respectively. As can be seen, the first blade 14 and the three third blades 15 (shown as first third blade 15', second third blade 15'', and third third blade 15''' for clarity) have coatings of identical thicknesses 53, all of which are thinner than the coating thickness 55 of coating 52 of the second blade 16.

Figure 8:
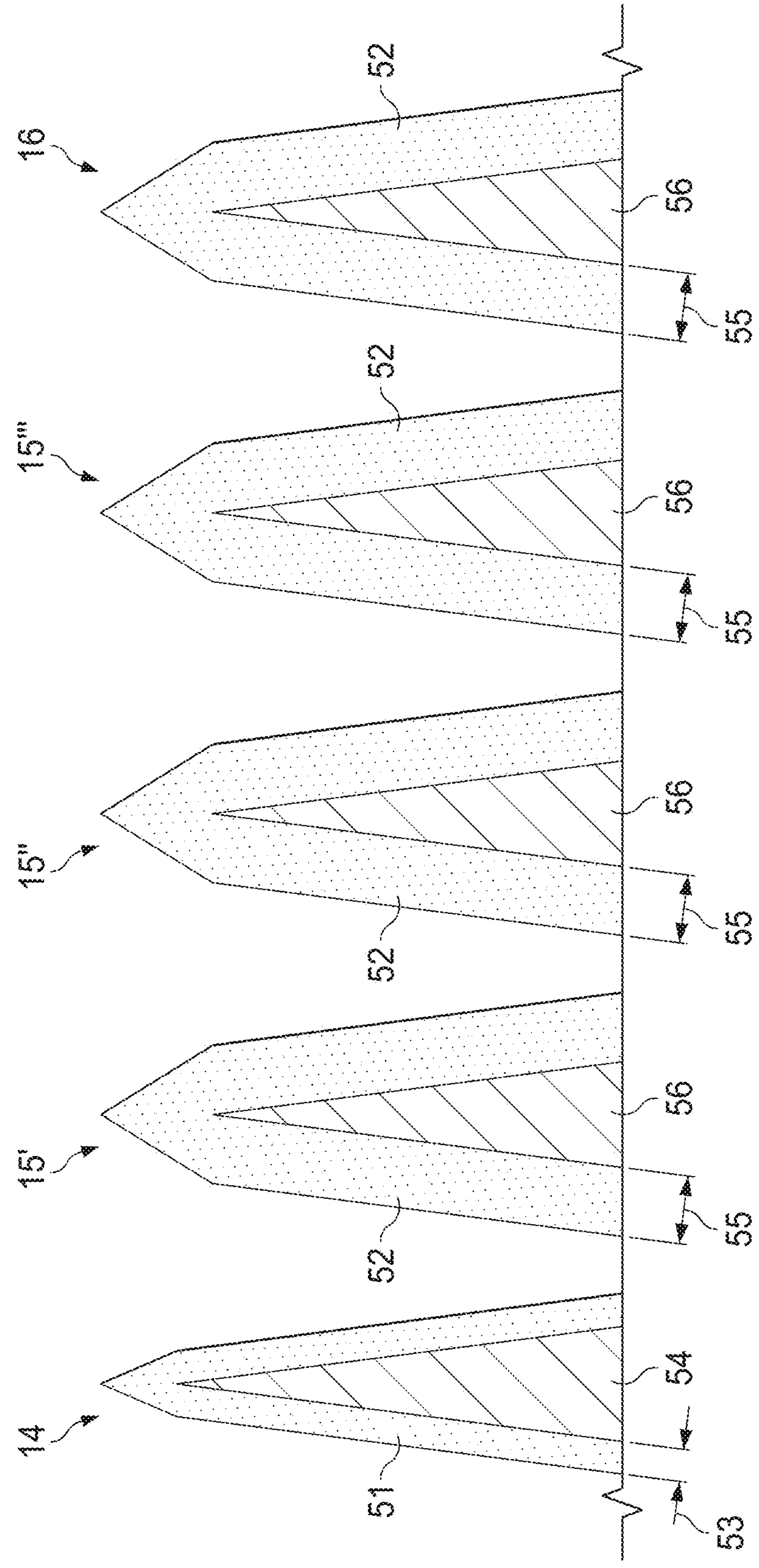

FIG. 8 depicts an illustration of cross-sectional views of portions of the blade edges within the razor cartridge 8 showing coatings 51, 52 on each blade 14, 16, and substrates 54, 56, respectively. As can be seen, the second blade 16 and the three third blades 15', 15'', and 15''' have coatings of identical thicknesses 55, all of which are thicker than the coating thickness 53 of the first blade 14.

Figure 9:
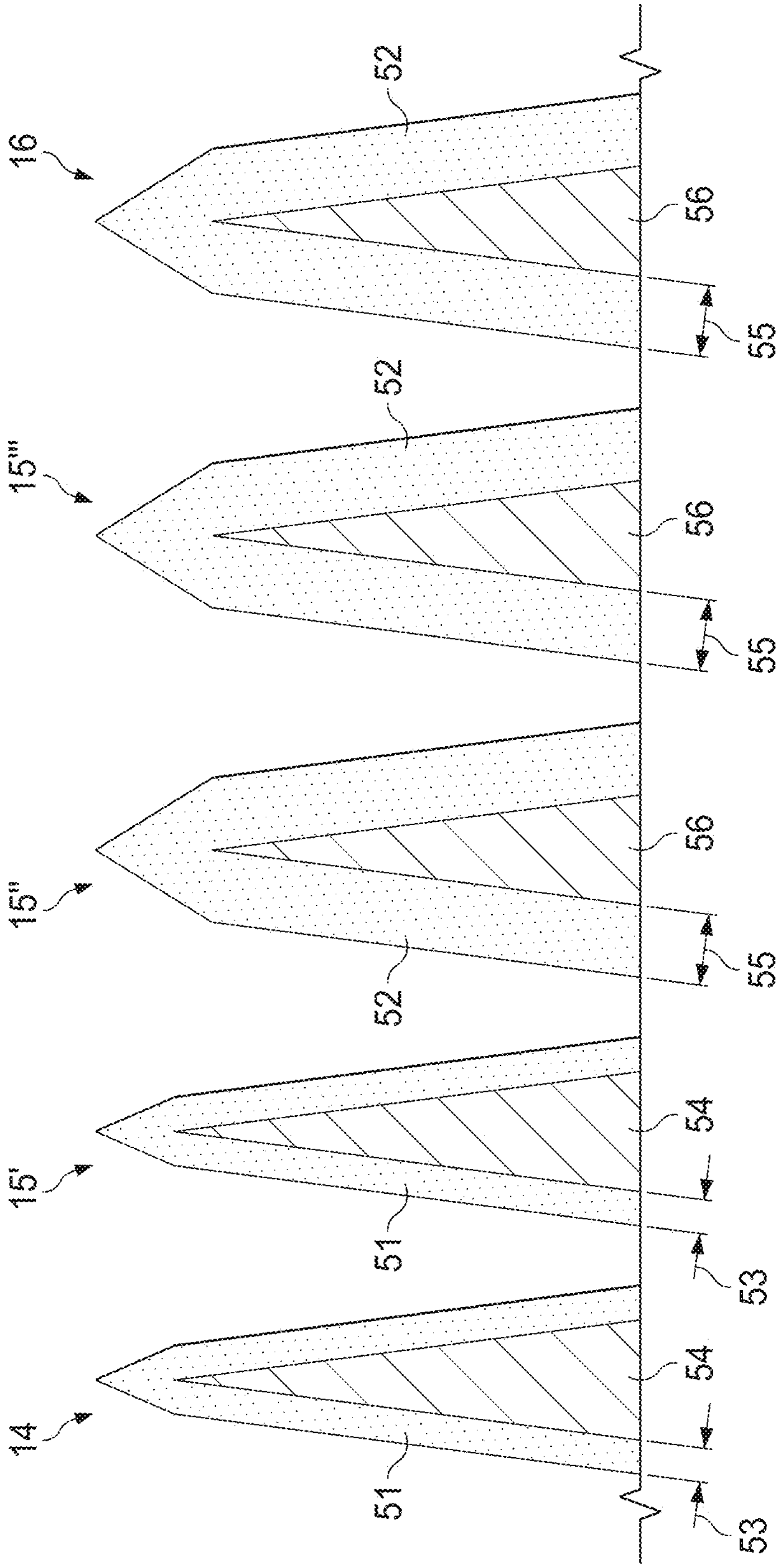

FIG. 9 depicts an illustration of cross-sectional views of portions of the blade edges within the razor cartridge 8 showing coatings 51, 52 on each blade 14, 16, and substrates 54, 56, respectively. As can be seen, the first blade 14 and an adjacent one, a first 15' of the three third blades 15 have coatings of identical thicknesses 53, both of which are thinner than the coating thickness 55 of the second blade 16 and the remaining two third blades 15'' and 15'''.

Figure 10:
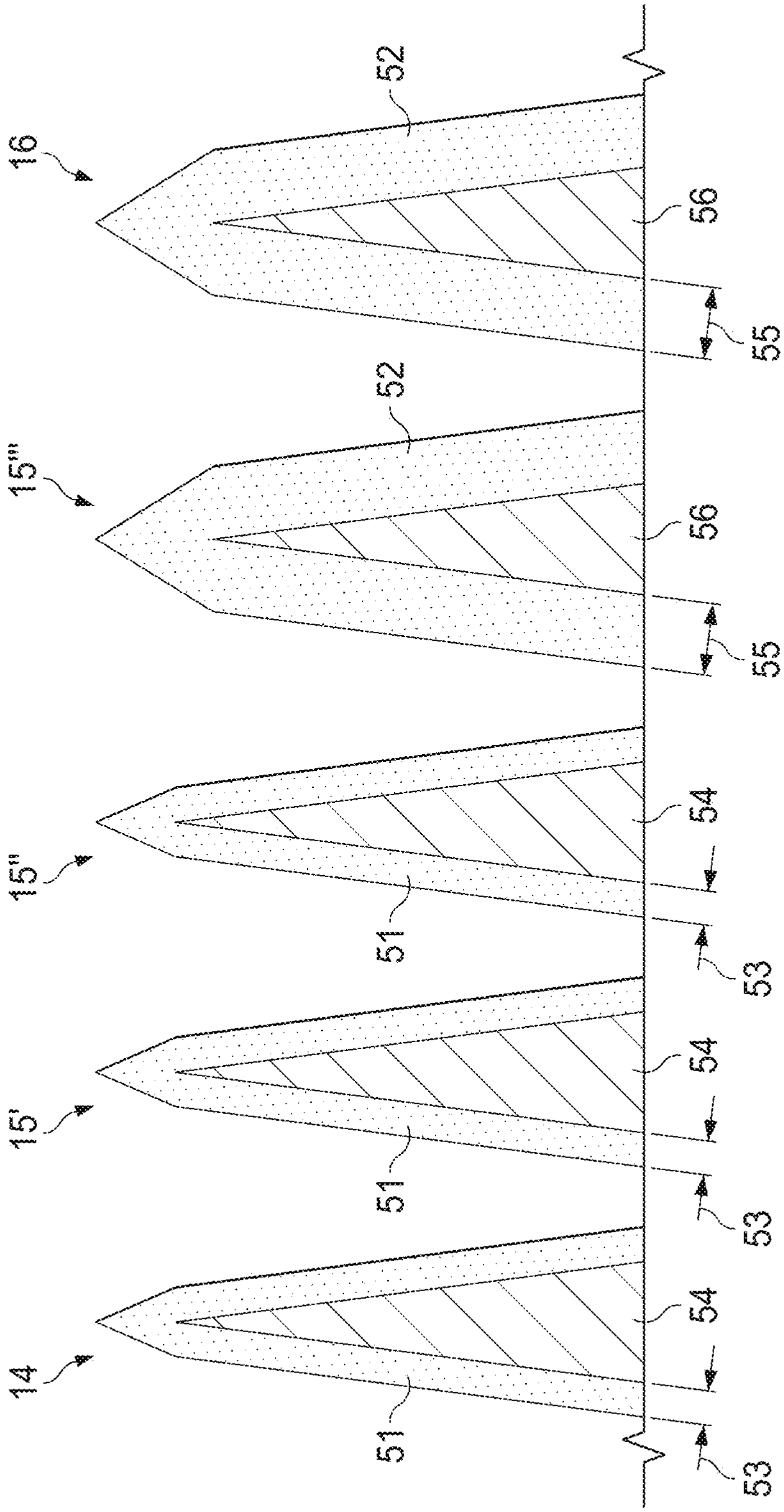

FIG. 10 depicts an illustration of cross-sectional views of portions of the blade edges within the razor cartridge 8 showing coatings 51, 52 on each blade 14, 16, and substrates 54, 56, respectively. As can be seen, the first blade 14 and two of the three third blades 15' and 15" have coatings of identical thicknesses 53, all of which are thinner than the coating thickness 55 of the second blade 16 and the remaining one third blade 15.

As noted above, the present invention contemplates that the first blade does not necessarily have to be the blade most proximal or nearest to the guard and can be defined as a blade edge nearer or closer to the guard when compared to the location of a second blade. Similarly, the present invention contemplates that the second blade does not necessarily have to be the most proximal or nearest blade to the cap and can be defined as a blade edge nearer or closer to the cap when compared to the location of the first blade.

Figure 11:
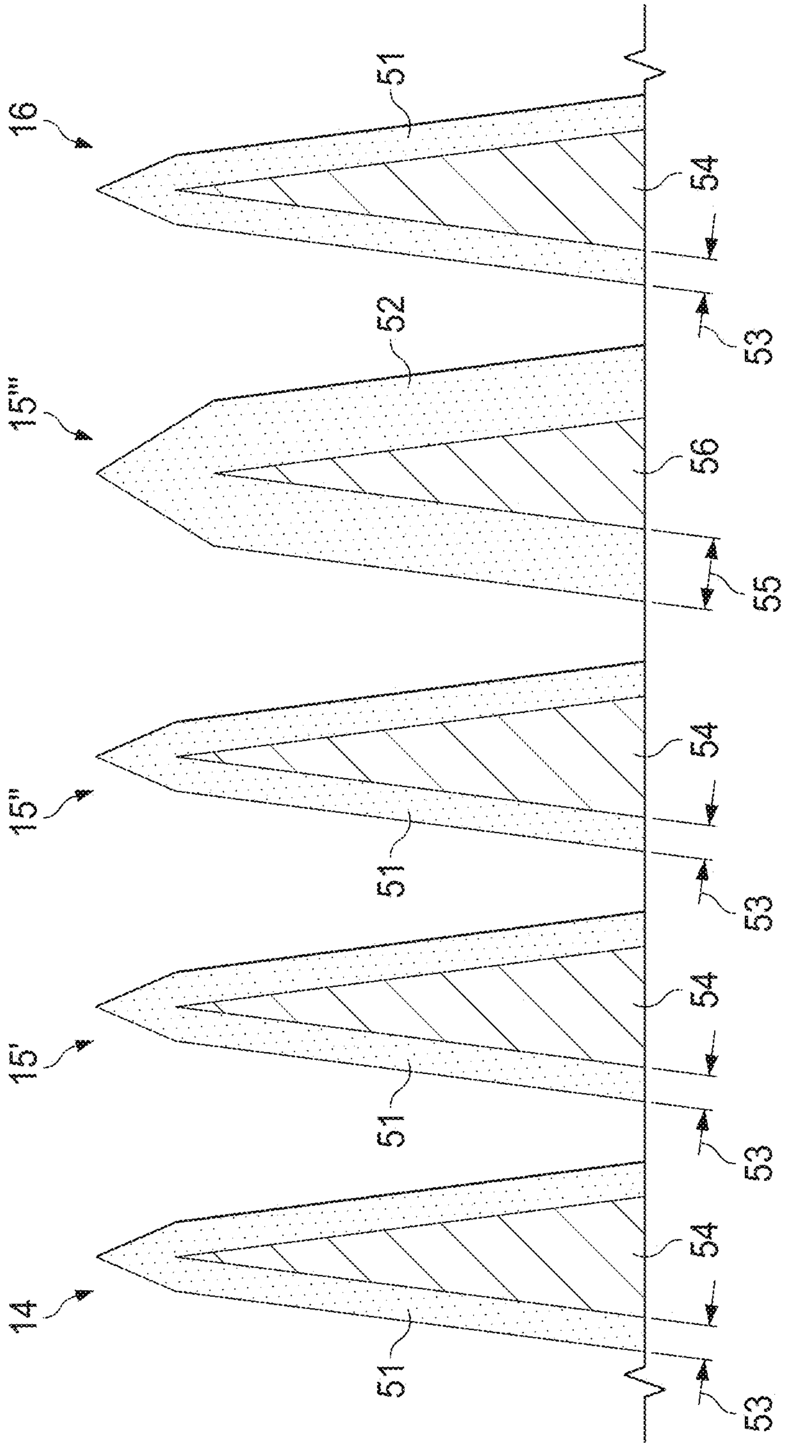
Figure 12:
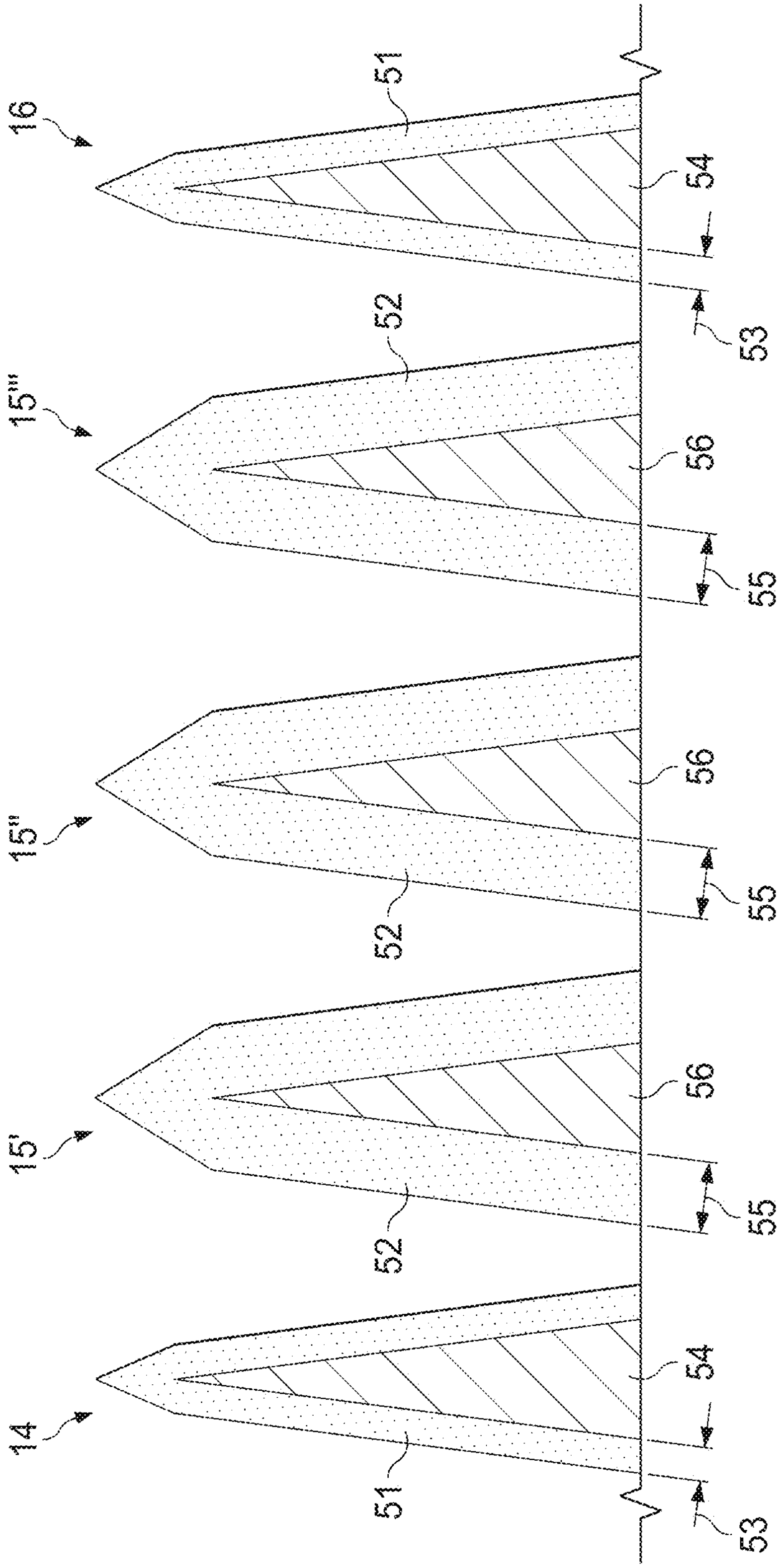
Figure 13:
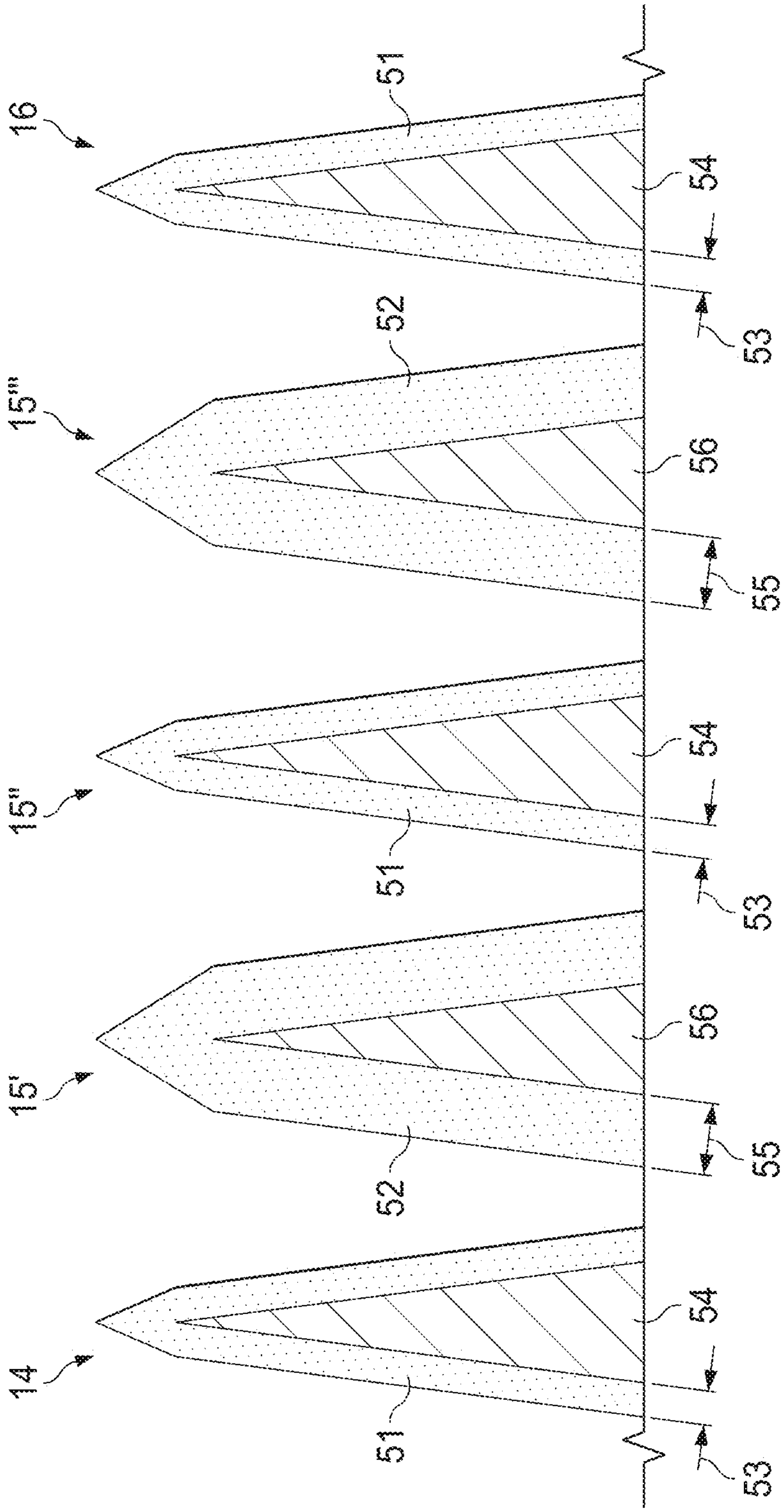
Figure 14:
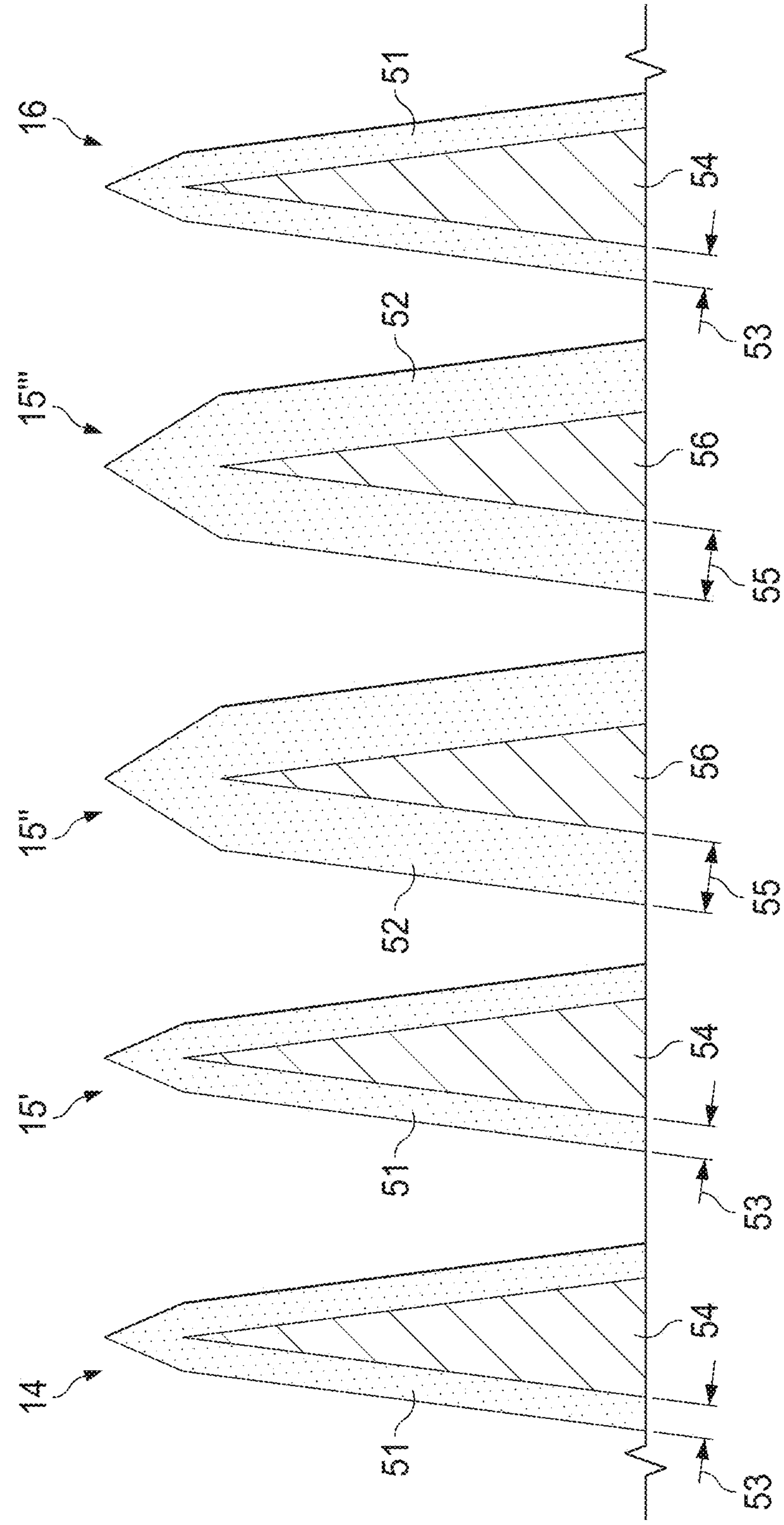

Accordingly, the present invention contemplates a second blade 16 having a thicker coating disposed in a third blade position of the razor cartridge as shown in FIG. 11 which depicts an illustration of cross-sectional views of portions of the blade edges within the razor cartridge 8 showing coatings 51, 52 on each blade 14, 16, and substrates 54, 56, respectively. Here, while the third blade 15'" and the second blade 16 are numbered as before, the thicker coating of the third blade 15'" renders it, functionally as a "second blade" of the cartridge for purposes of the present invention. The third blade 15'" and the second blade can be thought to have effectively swapped positions. The third blade 15'" (or the effective "second blade" in the third blade 15'" position) is still nearer or closer to the cap than the first blade 14. In FIG. 11, the first blade 14 and two of the three third blades 15' and 15" adjacent to the first blade 14, along with the second blade 16 or effectively the third blade 15'" assuming a swap, which is, as shown, most proximal or closest to the cap 12, have coatings of identical thicknesses 53, all of which are thinner in dimension than the coating thickness 55 of the third blade 15'". Effectively, the "second blade" in this arrangement is in position 4 of the razor cartridge. In this embodiment, there are three blades (i.e. first blade 14 and adjacent third blades 15' and 15" and second blade 16) which have a coating thickness that is thinner than the coating thickness of the third blade 15'". Alternately, one or both of the first and third third blades may have the same thickness as the third third blade 15'" as shown in FIG. 12 where both the first third blade and second third blade, 15' and 15" respectively, have the same thickness as the third third blade 15'" of FIG. 11, in FIG. 13 where only the first third blade 15' has substantially the same thickness as the third third blade 15'" of FIG. 11, and in FIG. 14 where only the second third blade 15" has substantially the same thickness as the third third blade 15'" of FIG. 11. In these embodiments, the second blade 16 closest to the cap has a thickness which is nearly identical to the first blade 14. In such an arrangement, one or more of the third blades effectively acts as the "second blade" for the razor cartridge in that it is the blade which is closer to the cap structure and it has a thicker coating than the first blade.

Figure 15:
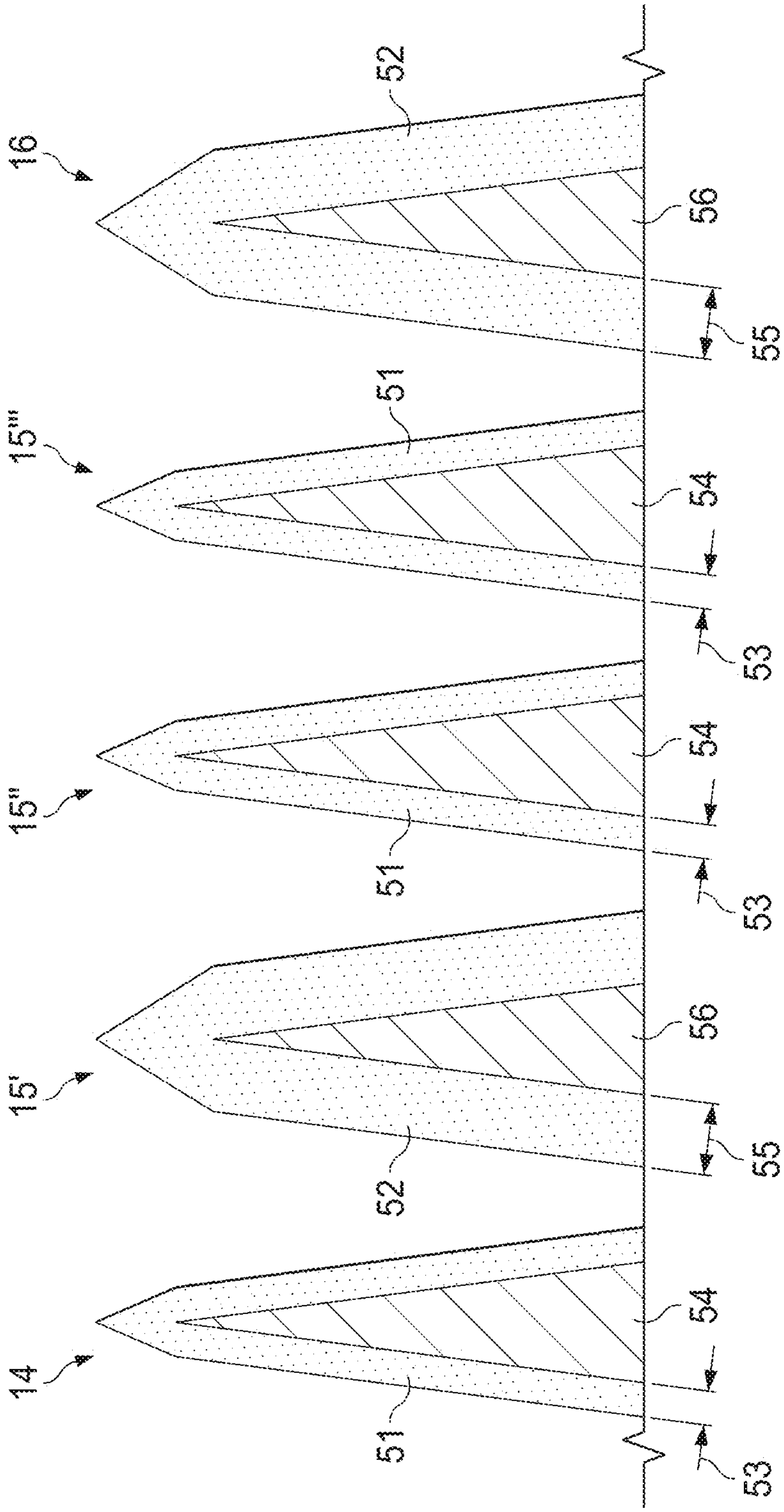

In an alternate embodiment shown in FIG. 15, an illustration of cross-sectional views of portions of the blade edges within the razor cartridge 8 is depicted showing coatings 51, 52 on each blade 14, 16, and substrates 54, 56, respectively, where a first blade 14 is in the principal position nearest the guard 10 and a first third blade 15' is in the next position adjacent to the first blade 14. The thickness of the coating of the first third blade 15' is substantially identical to that of the second blade 16 which is positioned closest to the guard 10. The first blade 14 has a coating thickness 53 which is thinner than the coating thickness 55 of both the first third blade 15' and the second blade 16. The other third blades 15 depicted, third blades 15" and 15'", have a coating thickness which is identical to the coating thickness of the first blade 14.

Figure 16:
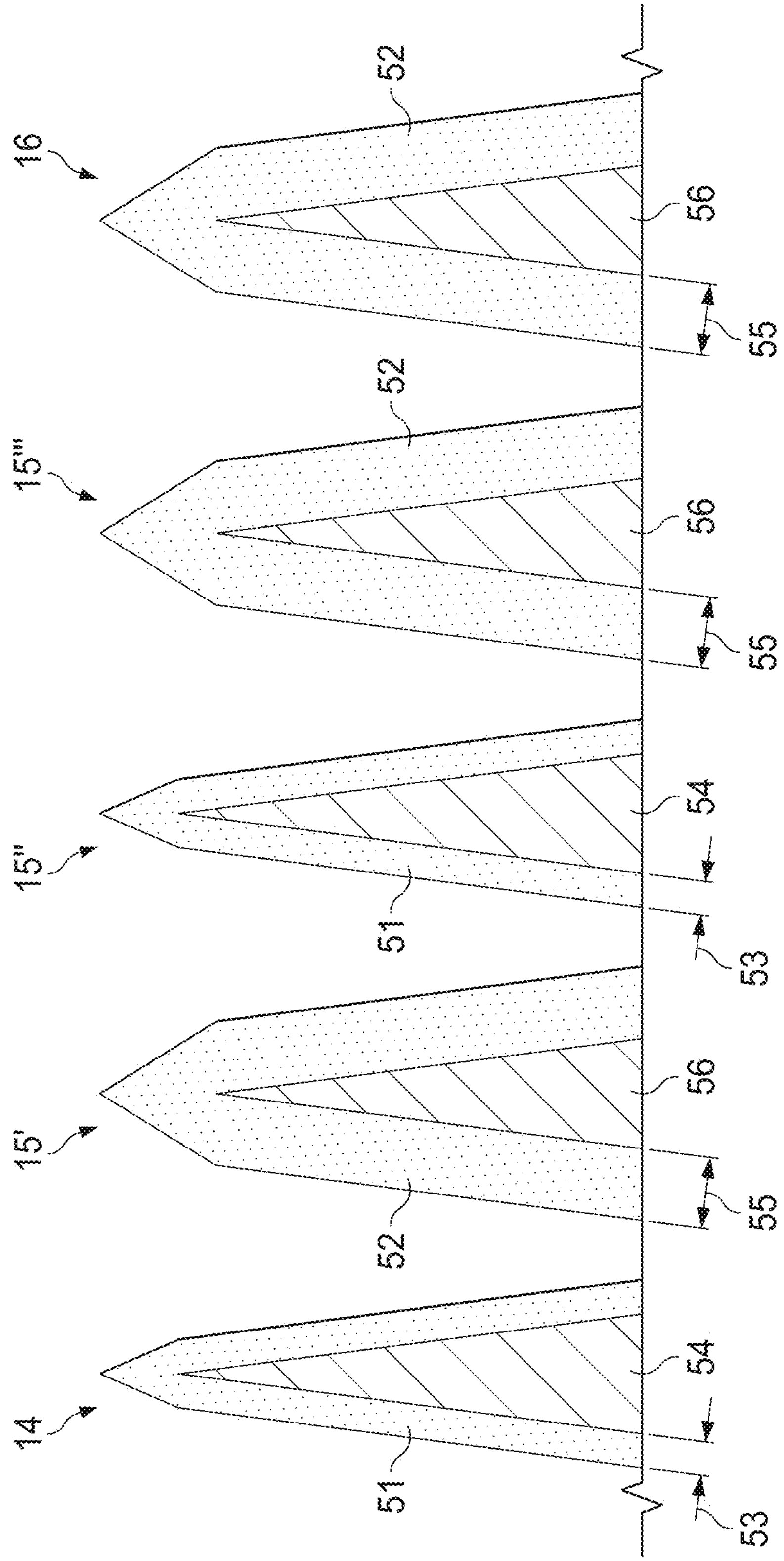
Figure 17:
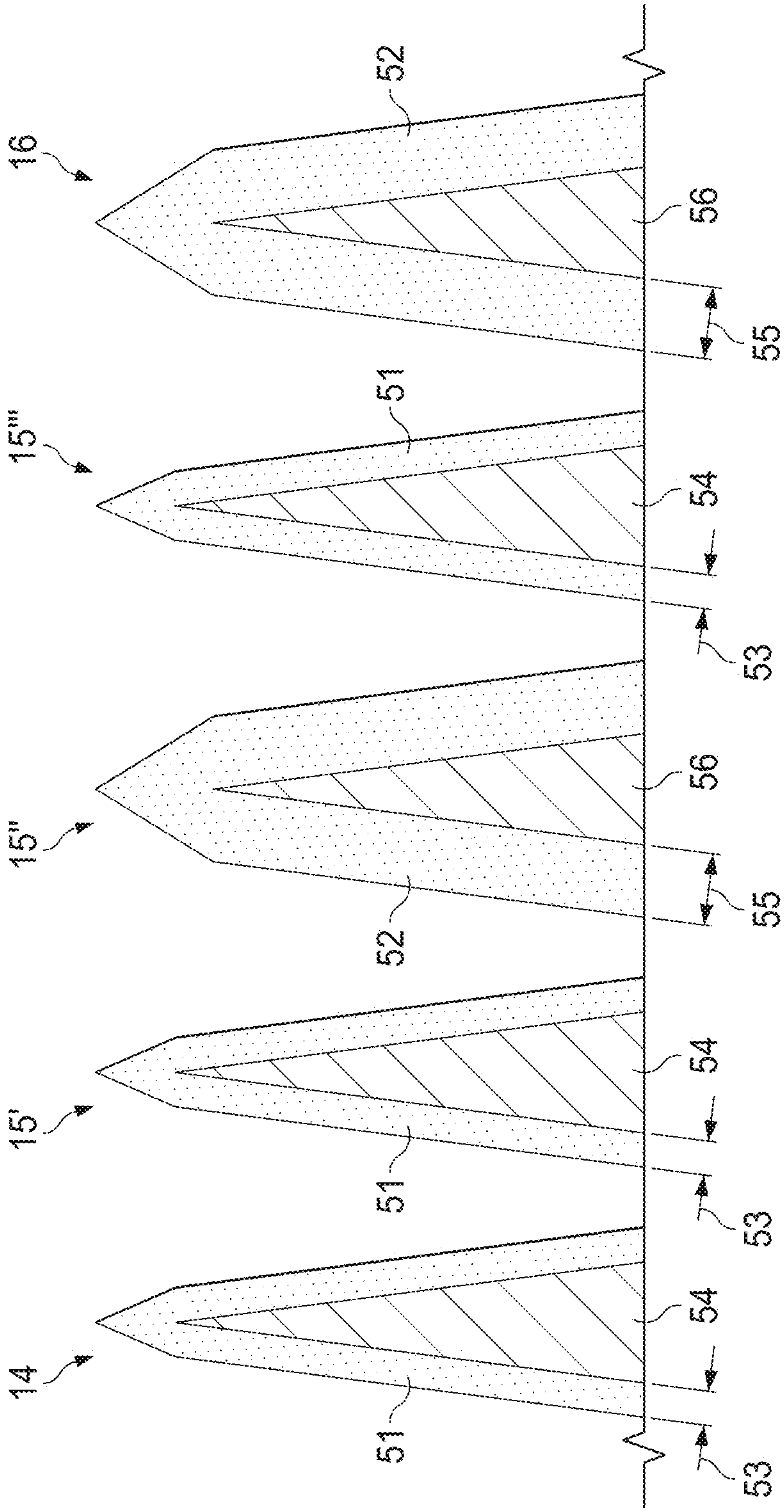
Figure 18:
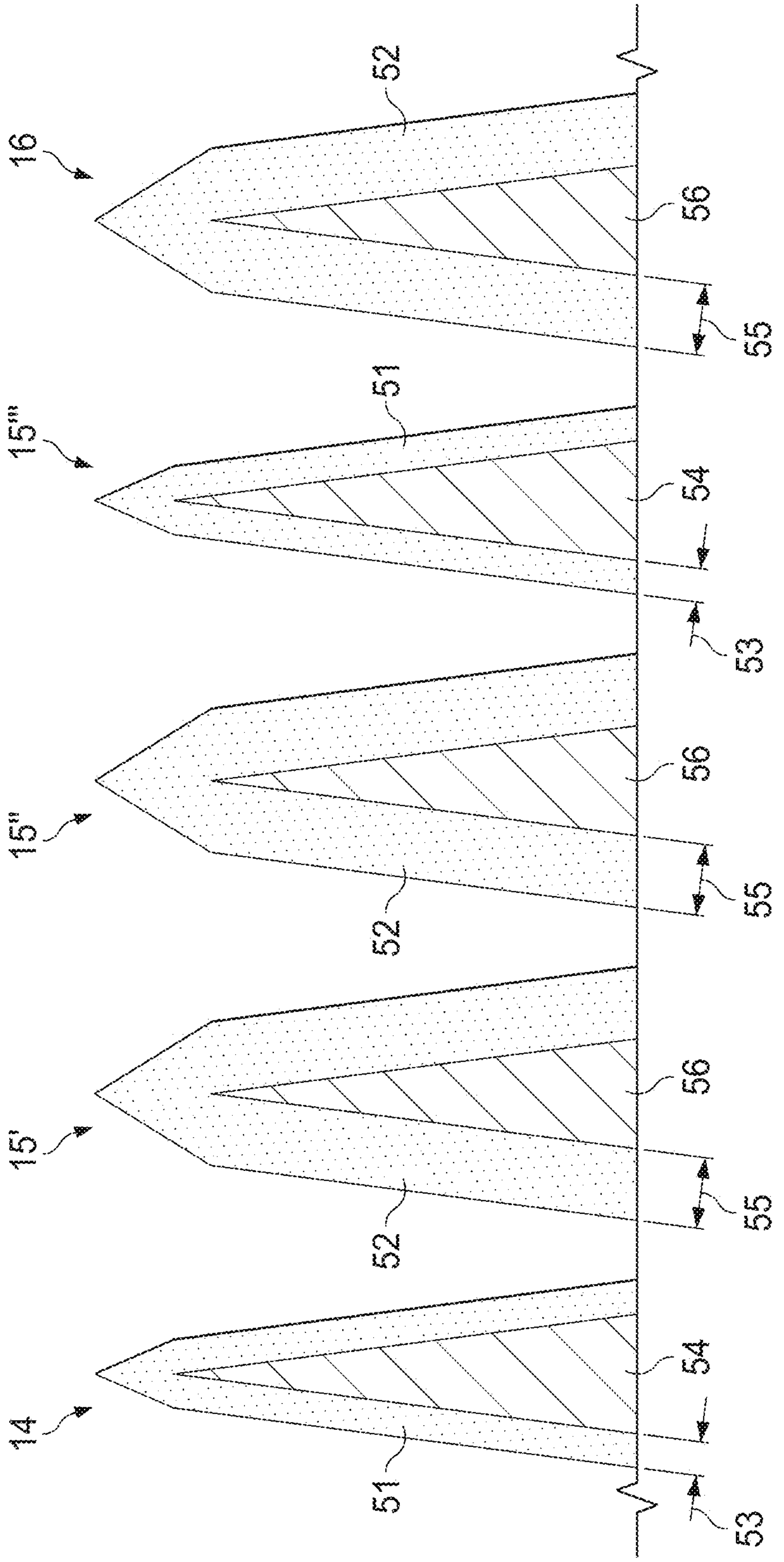

Further still, the first and third third blade 15' and 15'", respectively, may have coating thicknesses that are substantially identical to that of the second blade 16 as shown in alternate embodiment of FIG. 16, the second third blade 15" may have a coating that is substantially identical to that of the second blade 16 with first and third blades 15' and 15'" having a coating substantially identical to that of the first blade 14 as shown in alternate embodiment of FIG. 17, and the first and second third blade 15' and 15", respectively, may have coating thicknesses that are substantially identical to that of the second blade 16 as shown in alternate embodiment of FIG. 18.

FIG. 19 depicts an illustration of cross-sectional views of portions of the blade edges within the razor cartridge 8 showing coatings on each blade and substrates 20, respectively. As can be seen, the coating thicknesses increase incrementally across the razor cartridge from the first blade 14 to each of the third blades, and from the third blades to the second blade 16. None of the coating thicknesses on the razor blades are identical. As shown, the first coating 23 of the first third blade 15' adjacent to the first blade 14 has a coating thickness 24 which is not identical to the coating thickness 22 of the coating 21 of the first blade 14 but rather thicker than coating 21 of the first blade 14. The second third blade 15'" has a coating 25 with a thickness 26 which is not identical to that of the coating 21 of the first blade 14 or the coating 23 of the first of the third blades 15', but rather thicker than both coating 21 of the first blade and coating 23 of the first of the third blades 15'. The third third blade 15'" has a coating 27 with a thickness 28 which is not identical to any of the coatings of the first blade 14 or first two third blades 15' or 15" (e.g., coatings 21, 23, and 25, respectively), but rather is thicker than that of the first blade or first two third blades. Finally, the second blade 16 has a coating 29 with a thickness 30. Thickness 30 is the thickest coating of all the blades 14, 15', 15", 15'" as arranged in the razor cartridge (not shown).

As noted, one or more of the third blades can function as a "second blade" of the present invention. While razor cartridges have been described and shown supra with exemplary thicknesses, all permutations of varying coating thicknesses on the razor blade edges across a razor cartridge are within the scope and contemplated in the present invention. Also, while razor cartridges have been shown with two, three, four and five blades, razor cartridges having six or more blades may also be desirable.

Preferably, the blades of the present invention are arranged within the razor cartridge such that they have a progressive geometry. An example of a razor cartridges with blades arranged to have a progressive geometry is described in U.S. Pat. No. 6,212,777, incorporated herein by reference in its entirety.

In some instances, the first blade has a coating thickness at least 5% less than the coating thickness of the second blade. Preferably, the first blade has a coating thickness at least about 10% less than the coating thickness of the second blade, and up to about 50% less than the coating thickness of the second blade.

In general, the hard coating thickness of the first blade is between about 300 Angstroms and 1800 Angstroms, preferably about 500 to about 1000 Angstroms, and more preferably, about 600 to about 925 Angstroms. These ranges incorporate all hard coating materials, inclusive of all hard coating materials making up the overall hard coating of the first blade.

The hard coating thickness of the first blade is less than that of the second blade. Preferably, the first blade has a hard coating thickness of at least about two times less than that of the second blade.

Though not considered part of the overall hard coating, it should be noted that a soft coating applied to a finished first blade or a second blade can generally add about 200 Angstroms to about 5000 Angstroms to the overall hard coating.

In general, the hard coating thickness of the second blade is between about 500 Angstroms and about 3500 Angstroms, preferably about 1500 Angstroms to about 2700 Angstroms. The hard coating of the second blade is thicker than the hard coating of the first blade. These ranges incorporate all hard coating materials, inclusive of all hard coating materials making up the overall hard coating of the first blade. Accordingly, if more than one type of material makes up the hard coating layer, then the summation of thicknesses of each hard coating layer is utilized for the thickness of the overall hard coating.

In the present invention, a first blade has a coating thickness of at least about 500 Angstroms less than that of the second blade coating. In one embodiment, a thickness of the first hard coating has a thickness less than about 800 Angstroms and a thickness of the second hard coating is greater than about 800 Angstroms. In the present invention, the ratio of thicknesses of second coating to the first coating is about 1.5 to about 4.5, and more preferably the ratio is about 2.7. Preferably, in the present invention, a ratio of thickness of a second hard coating to a first hard coating is about 1.5 to about 4.5 times, preferably at least about 2, and most preferably about 2.7.

Providing a blade having thicker coating(s) can be accomplished by having one or more of the layers that make up the overall coating on the blade edge be thicker. For instance, referring to FIG. 20, there is shown a finished first blade 14 including an overall coating 51 having a substrate 54 and multiple coating layers such as interlayer 134, hard coating layer 136, overcoat layer 138, and outer layer 130. The substrate 54 is typically made of stainless steel though other materials can be employed. An example of a razor blade having a substrate, interlayer, hard coating layer, overcoat layer and an outer layer is described in U.S. Pat. No. 6,684,513.

Interlayer 134 is used to facilitate bonding of the hard coating layer 136 to the substrate 50. Examples of suitable interlayer material are niobium, titanium and chromium containing material. A particular interlayer is made of niobium greater than about 100 Angstroms and preferably less than about 500 Angstroms thick. The interlayer may have a thickness from about 150 Angstroms to about 350 Angstroms, and more preferably about 160 to 240 Angstroms. PCT 92/03330 describes use of a niobium interlayer.

Hard coating layer 136 provides improved strength, corrosion resistance and shaving ability and can be made from any of the materials described above. Preferably hard coating layer 136 is made of diamond, amorphous diamond or DLC. The hard coating 136 of blade 14 has a thickness 137. A particular embodiment for the first blade 14 includes a hard coating comprised of DLC having a thickness 137 of between about 100 Angstroms to about 1,000 Angstroms, preferably from about 200 Angstroms to about 750 Angstroms, more preferably between about 300 Angstroms to about 600 Angstroms, and most preferably about 450 Angstroms to about 550 Angstroms. DLC layers and methods of deposition are described in U.S. Pat. No. 5,232,568. As described in the "Handbook of Physical Vapor Deposition (PVD) Processing, "DLC is an amorphous carbon material that exhibits many of the desirable properties of diamond but does not have the crystalline structure of diamond."

Overcoat layer 138 is used to reduce the tip rounding of the hard coated edge and to facilitate bonding of the outer layer to the hard coating while still maintaining the benefits of both. Overcoat layer 138 is preferably made of chromium containing material, e.g., chromium or chromium alloys or chromium compounds that are compatible with polytetrafluoroethylene, e.g., chromium platinum. A particular overcoat layer is chromium about 100 to about 200 Angstroms thick. Overcoat layer may have a thickness of from about 50 Angstroms to about 500 Angstroms, preferably from about 100 Angstroms to about 300 Angstroms, and most preferably about 180 Angstroms to about 250 Angstroms. First blade 14 has a cutting edge that has less rounding with repeated shaves than it would have without such an overcoat layer.

Hard coating 136 is a hard coating whose thickness would be included in the overall hard coating thickness 53. The interlayer 134 comprised of niobium is considered a hard coating layer and thus, its thickness would be included in the hard coating thickness 53. The overcoat layer 138 comprised of chromium is also considered to be a hard coating and its thickness would be included in the hard coating thickness 53.

Outer layer 130 is used to provide reduced friction. The outer layer 130 may be a soft coating of a lubricious material such as a polymer composition or a modified polymer composition. The polymer composition may be polyfluorocarbon. A suitable polyflourocarbon is polytetrafluoroethylene, sometimes referred to as a telomer. A particular polytetrafluoroethylene material is Krytox LW 1200 available from Chemours, formerly Dupont. This material is a nonflammable and stable dry lubricant that consists of small particles that yield stable dispersions. It is furnished as an aqueous dispersion of 20% solids by weight and can be applied by dipping, spraying, or brushing, and can thereafter be air dried or melt coated. The layer is preferably less than 5,000 Angstroms and could typically be 1,500 Angstroms to 4,000 Angstroms, but can be as thin as 100 Angstroms, provided that a continuous coating is maintained. Provided that a continuous coating is achieved, reduced telomer coating thickness can provide improved first shave results. U.S. Pat. Nos. 5,263,256, 5,985,459, and 10,118,304 which are hereby incorporated by reference, describe techniques which can be used to change the thickness of an applied telomer layer.

First blade 14 is made generally according to the processes described in the above referenced patents. A particular embodiment includes a niobium interlayer 134, DLC hard coating layer 136, chromium overcoat layer 138, and Krytox LW1200 polytetrafluoroethylene outer coat layer 130. Chromium overcoat layer 138 is deposited to a minimum of 100 Angstroms and a maximum of 500 Angstroms. It is deposited by sputtering using a DC bias (more negative than −50 volts and preferably more negative than −200 volts) and pressure of about 2 millitorr argon. The increased negative bias is believed to promote a compressive stress (as opposed to a tensile stress), in the chromium overcoat layer which is believed to promote improved resistance to tip rounding while maintaining good shaving performance. First blade 14 preferably has a tip radius ranging from about 200 to about 400 Angstroms, measured by SEM after application of overcoat layer 138 and before adding outer layer 130.

Figure 21:
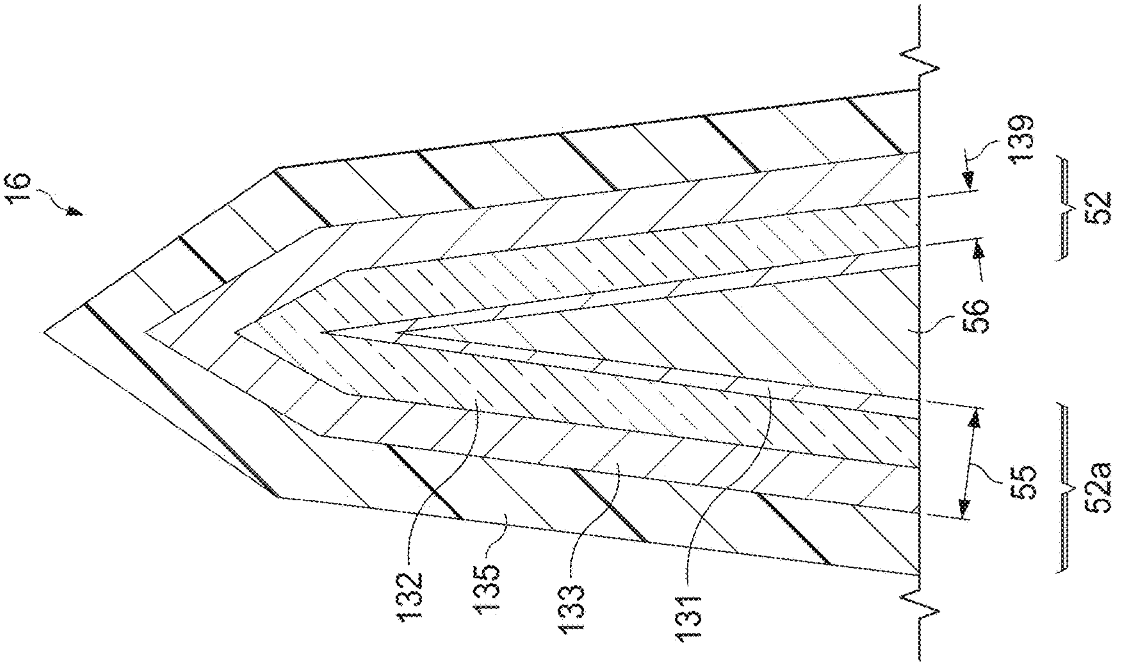
FIG. 21 is a diagrammatic cross-sectional view illustrating a finished second blade having a coated substrate.

Referring now to FIG. 21, there is shown a finished second blade 16 including substrate 56 having a hard coating 52 and an overall coating 52*a* which includes the hard coating 52 and a soft coating such as outer layer 135. The hard coating 52 may comprise individual layers, interlayer 131, hard coating layer 132*a*, and overcoat layer 133 which may comprise a portion of the hard coating 52. The substrate 56 is typically made of stainless steel though other materials can be employed. An example of a razor blade having a substrate, interlayer, hard coating layer, overcoat layer and an outer layer is described in U.S. Pat. No. 6,684,513.

As with the first blade 14, interlayer 131 can be used to facilitate bonding of the hard coating layer 132 to the substrate 56. Examples of suitable interlayer material are niobium, titanium and chromium containing material. A particular interlayer is made of niobium having a thickness greater than about 100 Angstroms and preferably less than about 500 Angstroms. For instance, the interlayer may have a thickness from about 150 Angstroms to about 350 Angstroms, and more preferably about 160 to 240 Angstroms. PCT 92/03330 describes use of a niobium interlayer.

Hard coating layer 132 provides improved strength, corrosion resistance and shaving ability and can be made from any of the materials described herein. Preferably coating layer 132 is made of diamond, amorphous diamond or DLC. The hard coating 132 of blade 16 has a thickness 139. In the present invention, hard coating thickness 139 is desirably about 1.5 to 4.5 times greater or thicker than the thickness 137 of the first blade, preferably at least about 2 times thicker than thickness 137, and most preferably about 2.75 times thicker than thickness 137 of the first blade 14. A particular embodiment for the second blade 16 includes hard coating or DLC thickness ranging from about 400 to about 3000 Angstroms, from about 900 Angstroms to about 2500 Angstroms, preferably greater than 1000 Angstroms, more preferably greater than 1200 Angstroms, and most preferably about 1700 to about 2500 Angstroms. DLC layers and methods of deposition are described in U.S. Pat. No. 5,232,568. As described in the "Handbook of Physical Vapor Deposition (PVD) Processing," DLC is an amorphous carbon material that exhibits many of the desirable properties of diamond but does not have the crystalline structure of diamond.

Overcoat layer 133 is used to reduce the tip rounding of the hard coated edge and to facilitate bonding of the outer layer to the hard coating while still maintaining the benefits of both. Overcoat layer 133 is preferably made of chromium containing material, e.g., chromium or chromium alloys or chromium compounds that are compatible with polytetrafluoroethylene, e.g., chromium platinum. A particular overcoat layer is chromium about 100 to about 200 Angstroms thick. Overcoat layer may have a thickness of from about 50 Angstroms to about 500 Angstroms, preferably from about 100 Angstroms to about 300 Angstroms, and most preferably 180 Angstroms to about 250 Angstroms. Second blade 16 has a cutting edge that has less rounding with repeated shaves than it would have without the overcoat layer.

Hard coating 132 is a hard coating whose thickness would be included in the overall hard coating thickness 55. The interlayer 131 comprised of niobium is considered a portion of overall hard coating 52 and thus, its thickness would be included in the hard coating thickness 55. The overcoat layer 133 comprised of chromium is also considered to be a portion of the hard coating 52 and its thickness would be included in the hard coating thickness 55.

Outer layer 135 is used to provide reduced friction. The outer layer 135 may be a soft coating of lubricious material such as a polymer composition or a modified polymer composition. The polymer composition may be polyfluorocarbon. A suitable polyflourocarbon is polytetrafluoroethylene sometimes referred to as a telomer. A particular polytetrafluoroethylene material is Krytox LW 1200 available from DuPont. This material is a nonflammable and stable dry lubricant that consists of small particles that yield stable dispersions. It is furnished as an aqueous dispersion of 20% solids by weight and can be applied by dipping, spraying, or brushing, and can thereafter be air dried or melt coated. The layer is preferably less than 5,000 Angstroms and could typically be 1,500 Angstroms to 4,000 Angstroms, and can be as thin as 100 Angstroms, provided that a continuous coating is maintained. Provided that a continuous coating is achieved, reduced telomer coating thickness can provide improved first shave results. U.S. Pat. Nos. 5,263,256, 5,985,459, and 10,118,304 which are hereby incorporated by reference, describe techniques which can be used to change the thickness of an applied telomer layer.

Second blade 16 is made generally according to the processes described in the above referenced patents. A particular embodiment of a second blade 16 includes a niobium interlayer 131, DLC or carbon containing hard coating layer 132, a chromium containing overcoat layer 133, and a Krytox LW1200 polytetrafluoroethylene outer coat layer 135. Chromium containing overcoat layer 133 is deposited to a minimum of 100 Angstroms and a maximum of 500 Angstroms. It is deposited by sputtering using a DC bias (more negative than −50 volts and preferably more negative than −200 volts) and pressure of about 2 millitorr argon. The increased negative bias is believed to promote a compressive stress (as opposed to a tensile stress), in the chromium overcoat layer which is believed to promote improved resistance to tip rounding while maintaining good shaving performance. Second blade 16 preferably has a tip radius of about 200 to about 400 Angstroms, measured by SEM after application of overcoat layer 133 and before adding outer layer 135.

Figure 20:
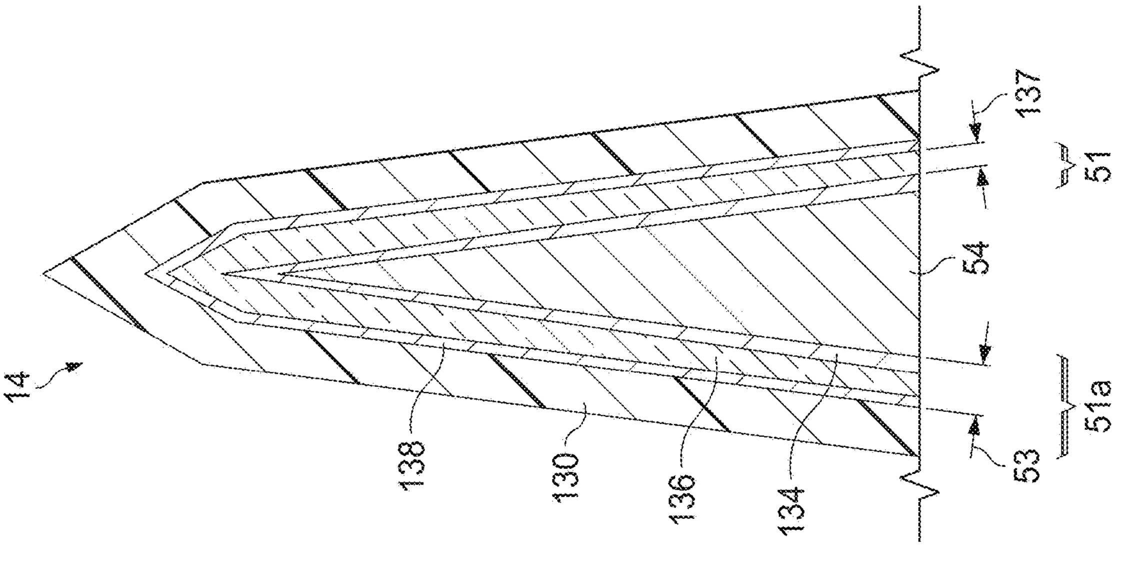
FIG. 20 is a diagrammatic cross-sectional view illustrating a finished first blade having a coated substrate.
Figure 21A:
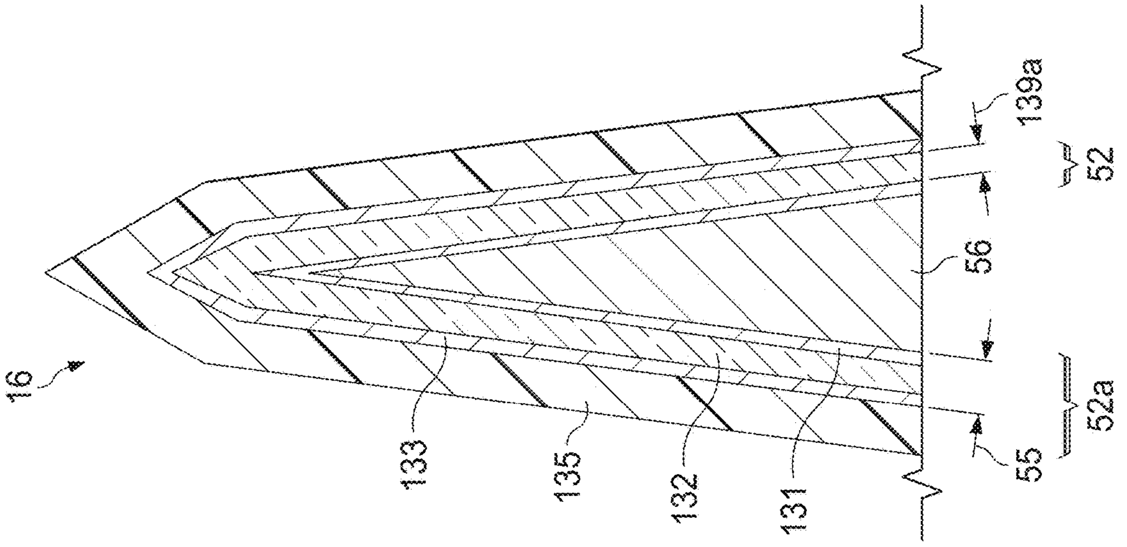
FIG. 21*a* is a diagrammatic cross-sectional view illustrating an alternate embodiment of a finished second blade having a coated substrate.

Referring now to FIG. 21*a*, there is shown a finished second blade 16 including substrate 56 having a hard coating 52 and an overall coating 52*a* which includes the hard coating 52 and a soft coating such as outer layer 135. The hard coating 52 may comprise individual layers, interlayer 131, hard coating layer 132*a*, and overcoat layer 133. In FIG. 21*a*, only one layer has a different thickness when compared to FIG. 20. The hard coating layer 132*a* of the second blade 16 in FIG. 21*a* is thicker than hard coating 136 of FIG. 20, or thickness 137 is less than thickness 139*a*. Hard coating layer 132*a* is a portion of the hard coating 52 whose thickness would be included in the overall hard coating thickness 55. However, an interlayer 131 comprised of niobium is considered a portion of the hard coating 52 and thus, its thickness would be included in the hard coating thickness 55 and the overcoat layer 133 comprised of chromium is also considered to be a portion of the hard coating 52 and its thickness would be included in the hard coating thickness 55.

Figure 22:
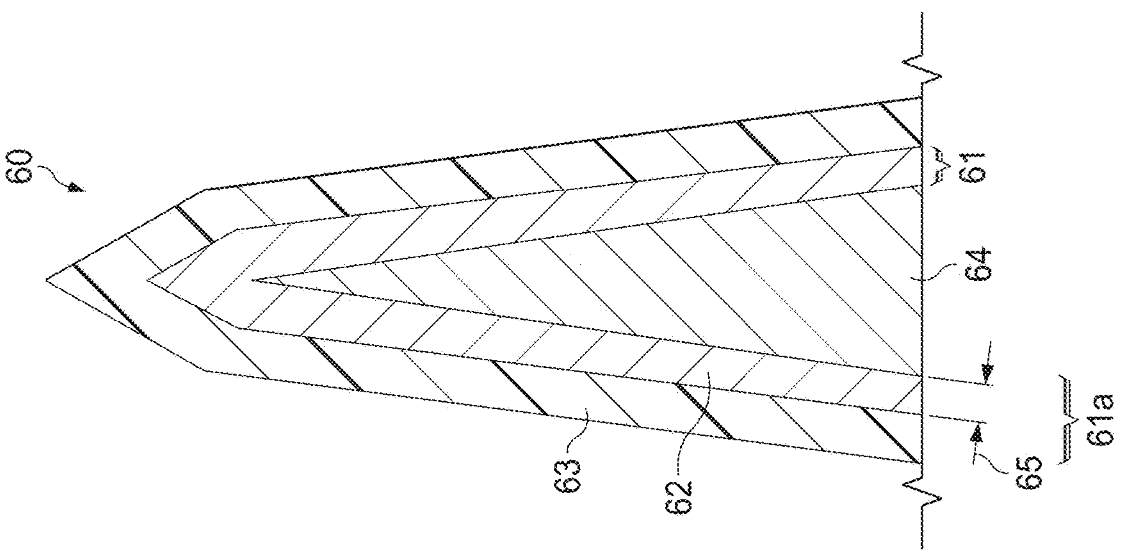
FIG. 22 is a diagrammatic cross-sectional view illustrating an alternative finished first or second blade of the present invention.

The present invention contemplates blades with any other feasible coatings. For instance, as depicted in FIG. 22, an alternate embodiment of a first or a second blade 60 in a razor cartridge of the present invention has a substrate 64 where an overall coating 61*a* includes a first layer 62 comprised of any of a Chromium only material or a Chromium containing material such as Platinum Chromium material, Chromium Nitride, Chromium Carbide, or any other Chromium containing material, whether doped, mixed, or otherwise comprising, and a lubricious outer coat layer 63 such as polytetrafluoroethylene. Coating 61*a* may also be comprised of any other feasible materials. The first layer 62 is the only hard coating in blade 60 and as such, the coating thickness 65 of first layer 62 accounts for the overall hard coating thickness.

It is also noted that the present invention contemplates that substrate 54 of the first blade 14 in FIG. 20 and substrate 56 of the second blade 16 of FIG. 21 can be different. For instance, substrate 56 may have a smaller shape, sharper profile, or comprise a different material than substrate 54 or vice-versa. Similarly, substrate 64 of FIG. 22 may have a different shape or profile or material than either of substrates 54 or 56.

A diagrammatic view of a coated edge region 141 of the first blade 14 is shown in FIG. 23. The first blade 14 includes stainless steel body portion or substrate 54 with a coating 51 disposed thereon as described herein. The coated wedge-shaped sharpened edge 141 has a tip 146. Tip 146 preferably has a radius of from about 125 to about 300 Angstroms with facets A and B that diverge from tip 146. The coating 51 has a thickness 143 of between about 300 Angstroms to about 1800 Angstroms when measured at a distance 142 of four micrometers from the blade tip 146. The thickness 143 is determined by the orthogonal distance along line P1 taken from a point T1 at the distance 142 on a line tangent to the exterior surface 51*a* of the hard coating 51 to a point T2 on a line tangent to the coating interface 51*b* with the substrate 54. A 90-degree angle is formed from exterior surface 51*a* and the perpendicular line P1. Effectively, the perpendicular distance across the coating between T1 and T2 represents the thickness 143 at distance 142.

The coating 51 has a thickness 145 of between about 300 Angstroms to about 1800 Angstroms when measured at a distance 144 of ten micrometers from the blade tip 146. The thickness 145 is determined by the orthogonal distance along line P2 taken from a point T3 on a line tangent to the exterior surface of the hard coating at the distance 144 on the exterior surface 51*c* of the coating 51 to a point T4 on a line tangent to the coating interface 51*d* with the substrate 54. A 90-degree angle is formed from exterior surface 51*c* and the perpendicular line P2. Effectively, the perpendicular distance across the coating between T3 and T4 represents the thickness 145 at distance 144. At distances beyond ten micrometers from the blade tip the coating 51 is substantially the same thickness. The coating 51 may taper down to lower thicknesses the further back from the tip (e.g., forty micrometers or more).

A diagrammatic view of a coated edge region 151 of the second blade 16 is shown in FIG. 24. The second blade 16 includes stainless steel body portion or substrate 56 with a coating 52 disposed thereon as described herein. The coated wedge-shaped sharpened edge 151 has a tip 156. Tip 156 preferably has a radius of from about 125 to about 300 Angstroms with facets A and B that diverge from tip 156. The coating 52 has a thickness 153 of between about 600 Angstroms to about 3000 Angstroms when measured at a distance 152 of four micrometers from the blade tip 156.

In order to provide a proper thickness value comparison, the thickness of the second blade is determined in the same manner, using the same technique, and at the same distance from the ultimate tip as the thickness of the first blade.

The thickness 153 is determined by the orthogonal distance along line P3 taken at the distance 152 from a point T5 on a tangent line on the exterior surface 52*a* of the hard coating 52 to a point T6 on a tangent line on the coating interface 52*b* with the substrate 54. A 90-degree angle is formed from exterior surface 52*a* and the perpendicular line P3. Effectively, the perpendicular distance across the coating 52 between T5 and T6 represents the thickness 153 at distance 152.

The coating 52 has a thickness 155 of between about 600 Angstroms to about 3000 Angstroms when measured at a distance 154 of ten micrometers from the blade tip 156. The thickness 155 is determined by the orthogonal distance along line P4 taken at a distance 154 from a point T7 on a tangent line on the exterior surface 52*c* of the coating 52 to a point T8 on a tangent line on the coating interface 52*d* with the substrate 54. A 90-degree angle is formed between exterior surface 52*c* and the perpendicular line P4. Effectively, the perpendicular distance across the coating 52 between T7 and T8 represents the thickness 155 at distance 154. At distances beyond ten micrometers from the blade tip the coating 52 is substantially the same thickness. The coating 52 may taper down to lower thicknesses the further back from the tip (e.g., forty micrometers or more).

Due to the mechanical complexity of the skin in response to a load, simulation modeling can predict the mechanical behavior of skin during various dynamic loading situations, such as those found during a shaving stroke. One such simulation technique is a finite element analysis model. An example of a finite element analysis technique with skin, hair, and a shaving device is described in U.S. Pat. No. 8,306,753, assigned to the Assignee hereof and incorporated herein by reference in its entirety.

Figure 25:
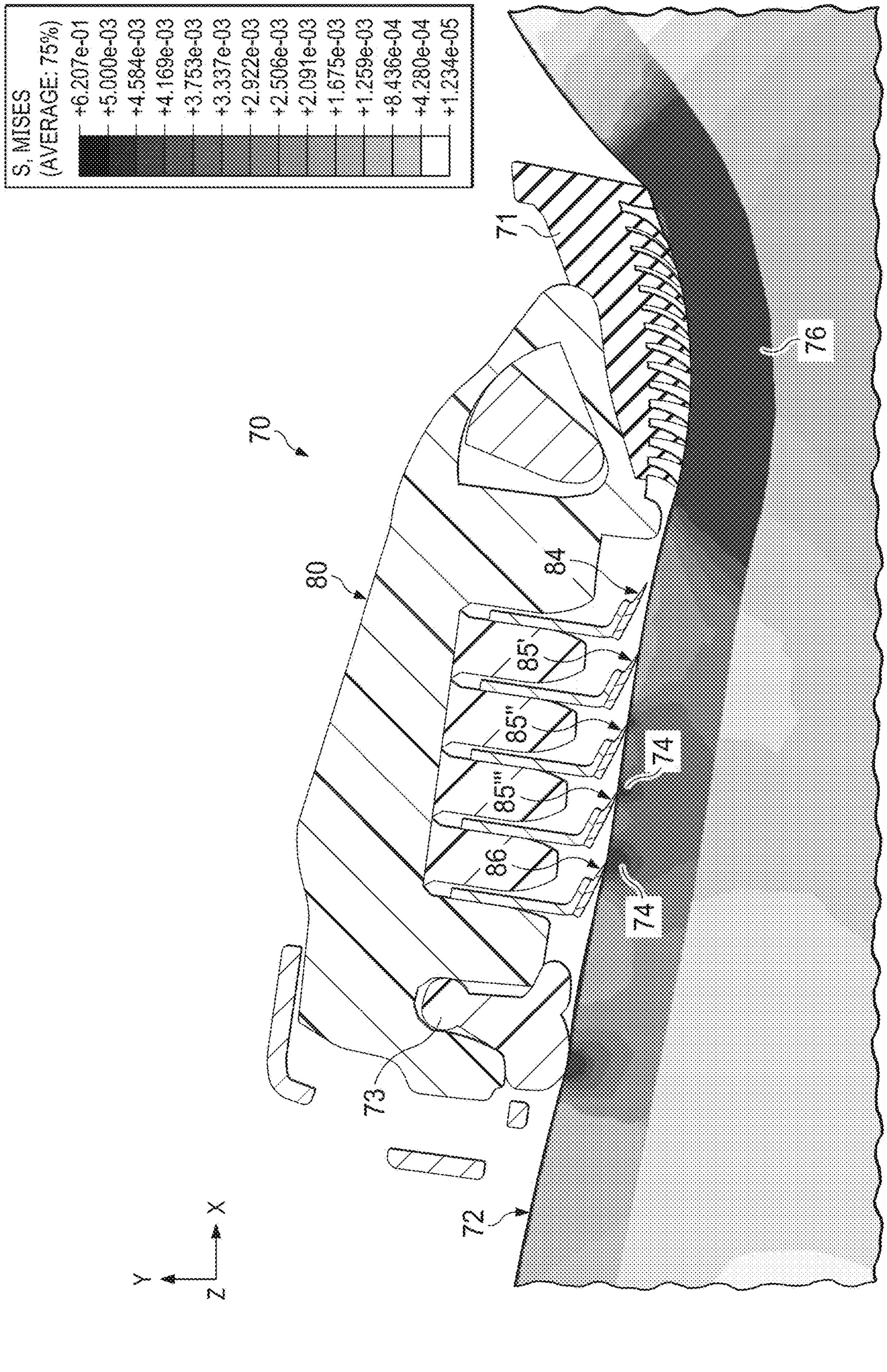
FIGS. 25 and 26 are cross-sectional views of a cartridge and skin profile of the prior art illustrating stress from the cartridge and blades on the skin.

FIG. 25 shows a cross-sectional diagram 70 of razor cartridge 80 having blades 84, 85, and 86 of the prior art applied on a finite element analysis model of skin depicting the cartridge as it would press or load against the skin 72.

The guard 71 and cap 73 are two areas of the razor cartridge 80 where the stress onto the skin may be the highest as indicated by the dark areas, red color, or hatching 74. The blades of the prior art cartridge also exhibit stress on the skin in areas 74 and, in particular, the blades towards the cap, e.g., blades 85''' and 86, are shown to comprise the most stress.

Figure 26:
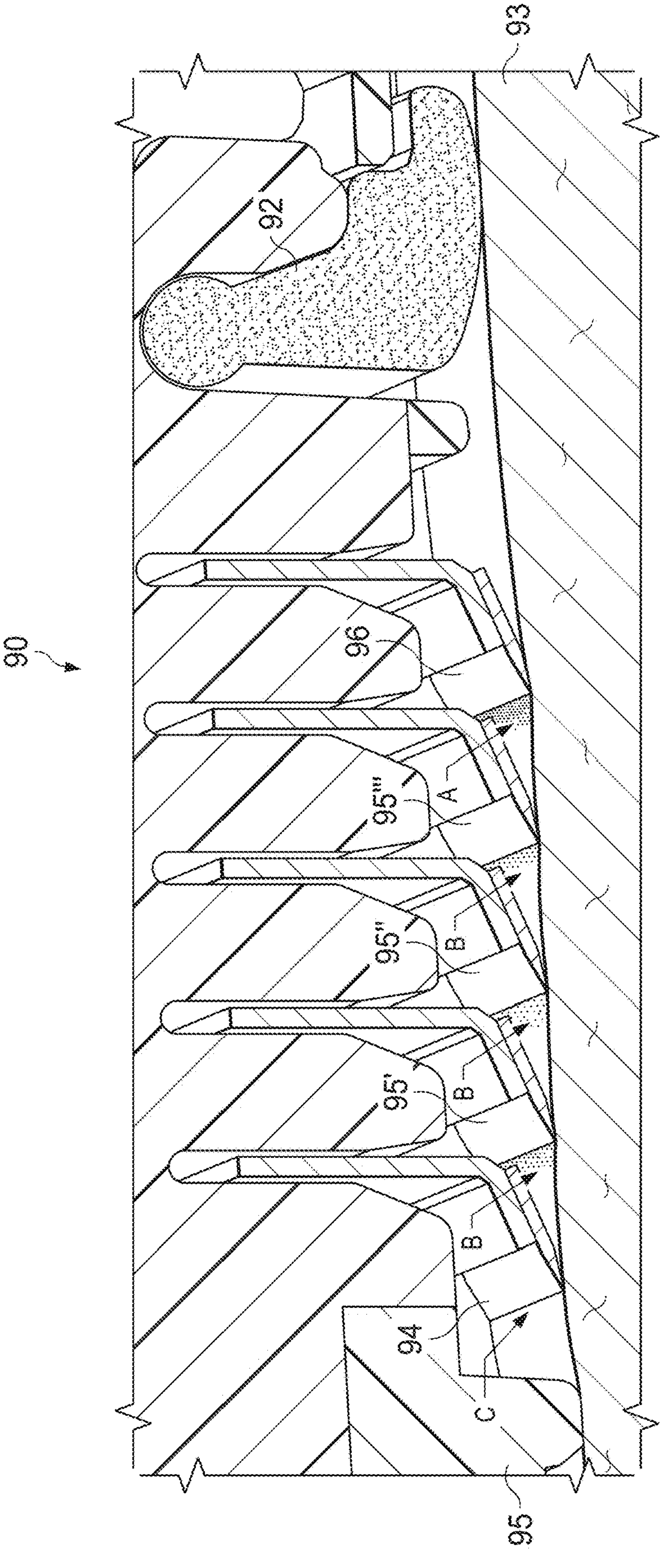

FIG. 26 depicts a 3-dimensional finite element model 90 illustrating the pressure areas A and B on the skin 92 of the five blades 96, 95', 95'', 95''', and 94 of a prior art cartridge such as that of FIG. 25. As with FIG. 25, the razor blade 96 which is disposed nearest the cap 92 has the highest degree of pressure area A, as indicated by the dark area A, followed by blades 95''', 95'', and 95' each with a slightly lower degree of pressure area B as compared to area A, while blade 94 nearest the guard structure 95 appears to have substantially no pressure as indicated in area C.

Figure 27:
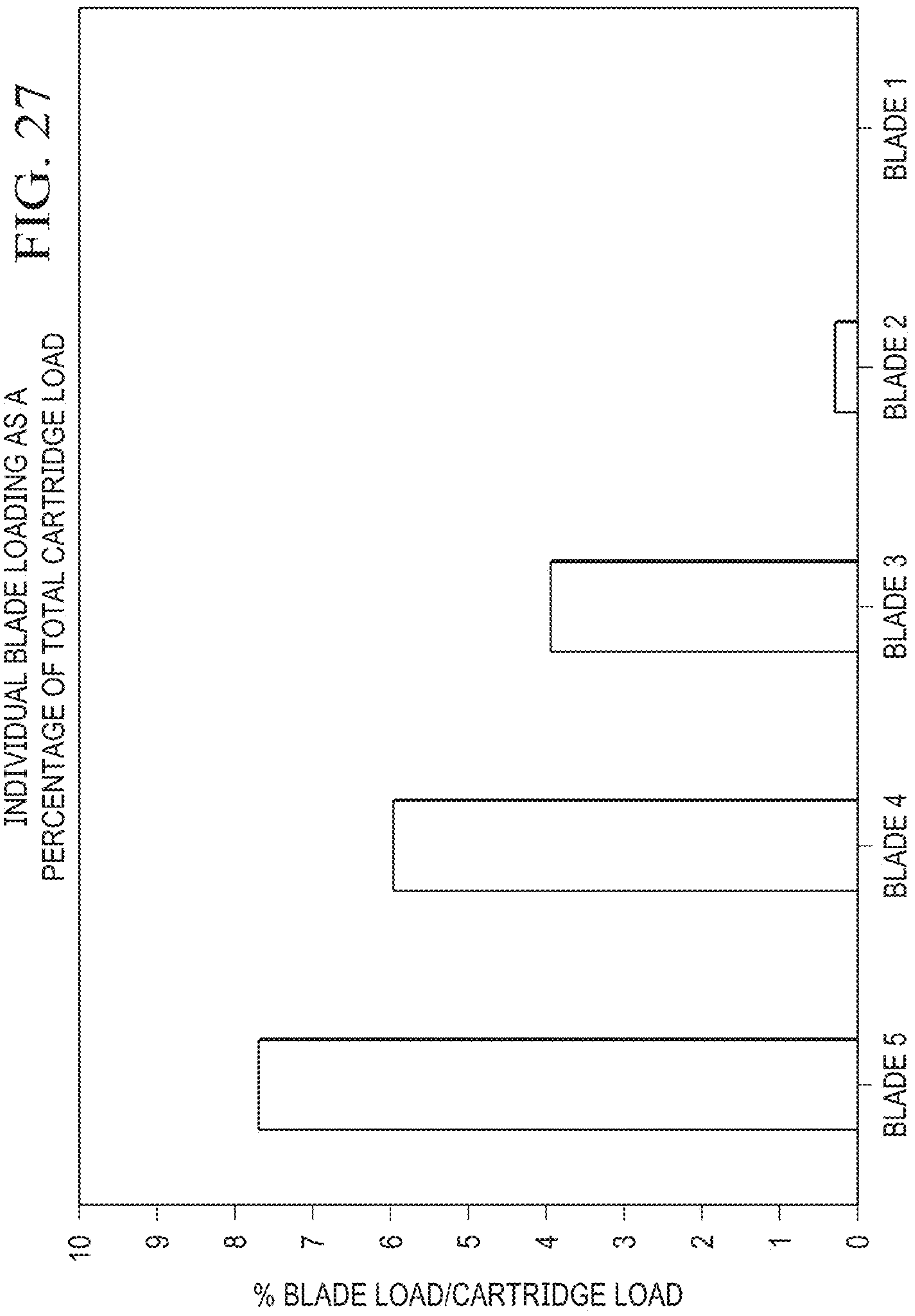
FIGS. 27 and 28 are graphs showing blade loads.

A representative graph of the individual blade load of each blade as a percentage of the total cartridge load in the prior art cartridges described herein can be seen in FIG. 27. Blade 5 (e.g., blade 96 in FIG. 26) has the highest blade load at about 7.6, blade 4 (e.g., blade 95''' of FIG. 26), has a load of about 5.9, blade 3 (e.g., blade 95'' of FIG. 26) has a load of about 3.9, blade 2 (e.g., blade 95' of FIG. 26) has a load of about 0.3, and blade 1 (closest to the guard structure, blade 94 of FIG. 26) has no load.

Figure 28:
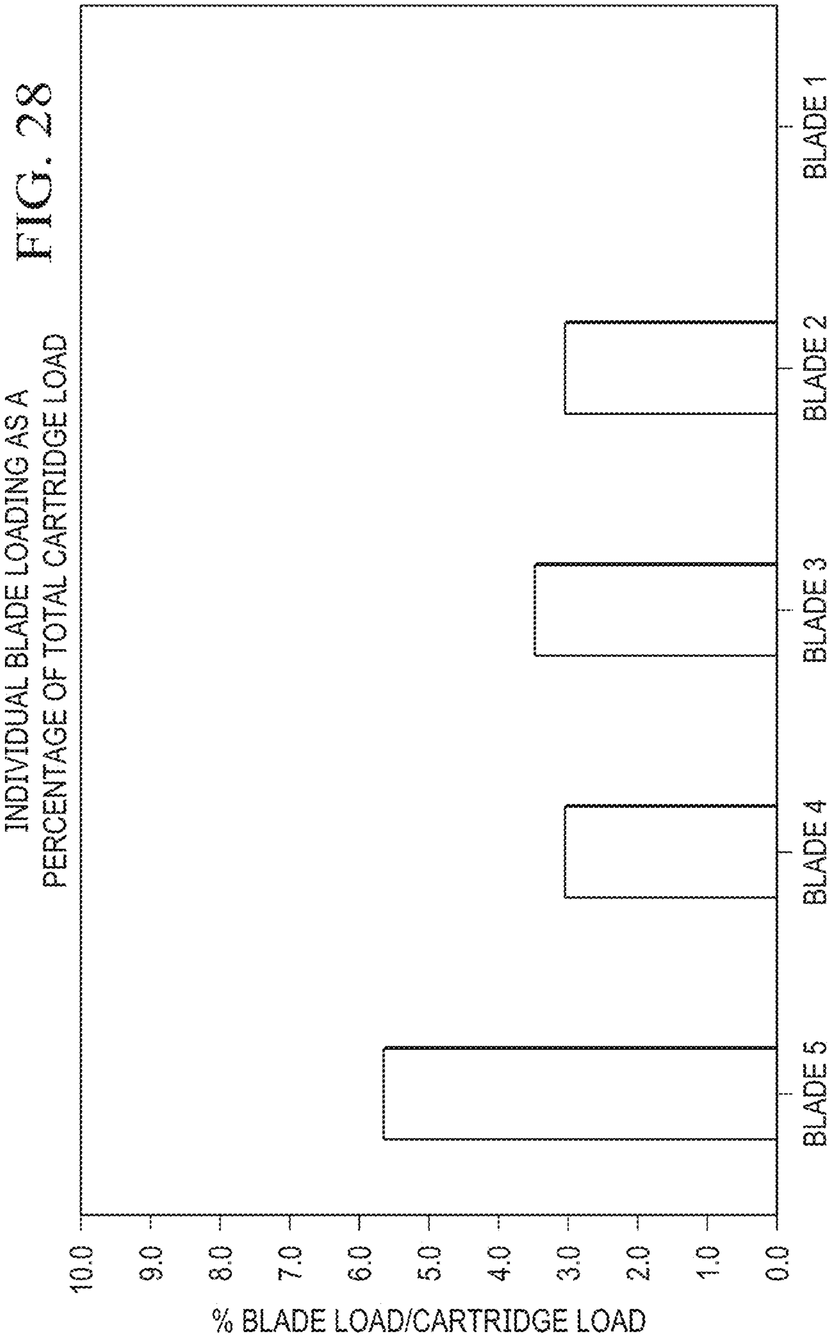

One benefit of the present invention can be realized with an arrangement of blades (e.g., FIG. 7) in a particular razor cartridge, as shown in FIG. 28, a representative graph depicting the reduction in individual blade load of each blade as a percentage of a total cartridge load. In FIG. 28, the load on blade 5 (e.g., blade 16 in FIG. 7) is significantly reduced to a load of about 5.7 from a load of about 7.6. While still the highest blade load, this reduction assists greatly in improved comfort and shave performance. Blade 4 (e.g., blade 15''' of FIG. 7), has a load of about 3, blade 3 (e.g., blade 15'' of FIG. 7) has a load of about 3.5, blade 2 (e.g., blade 15' of FIG. 7) has a load of about 3, and blade 1 (closest to the guard structure, blade 14 of FIG. 7) has no load.

Figure 29:
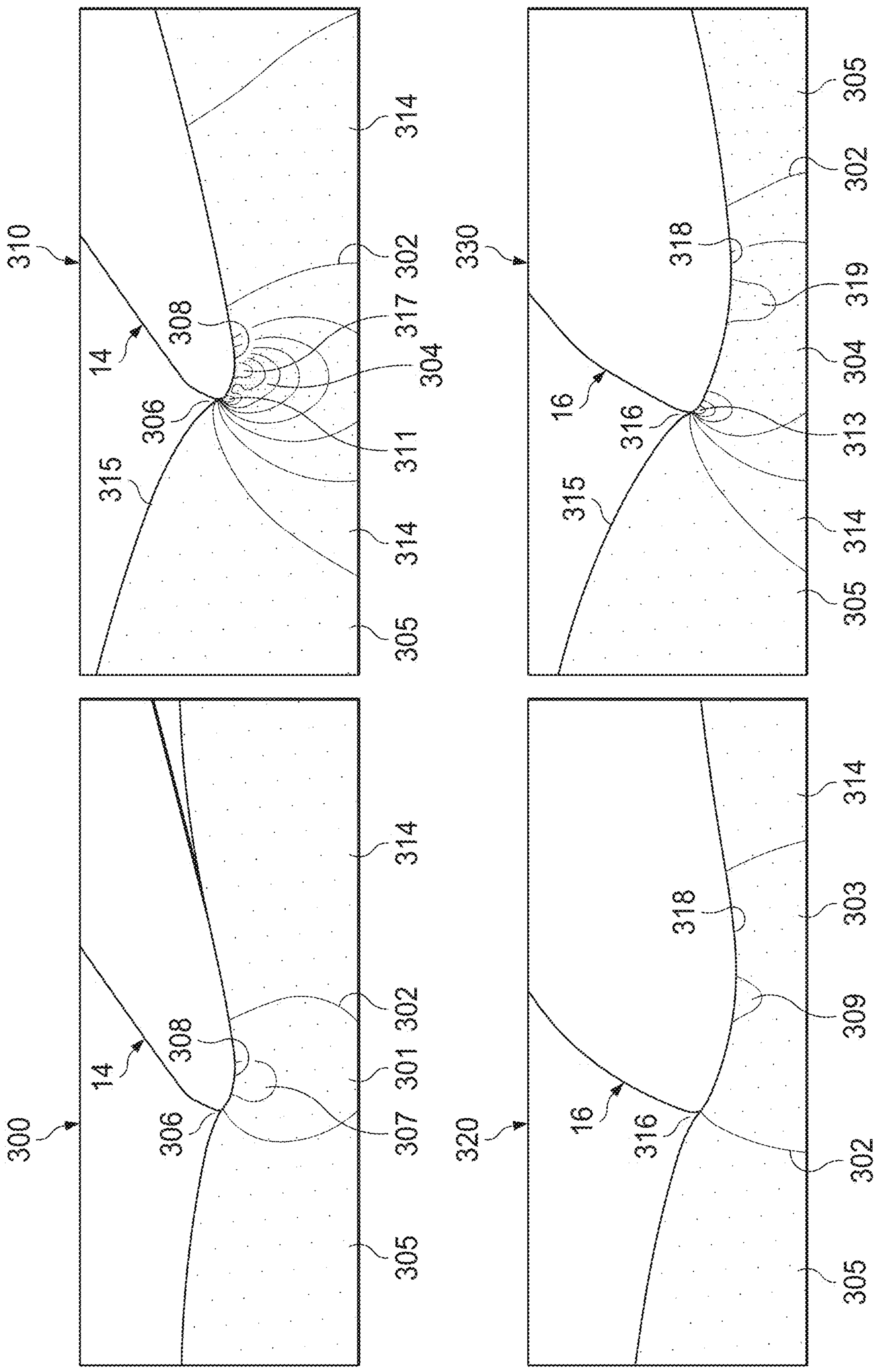
FIG. 29 are contour plots illustrating stress in a substrate from first and second blades of the present invention.

FIG. 29 shows four contour plots or maps 300, 310, 320, and 330 depicting stress in a substrate (e.g., skin mimic) resulting from contact with a blade under shaving loads. Stress, defined as the force per unit area, as noted, can act in different directions upon a substrate. Razor cartridges are desirably designed to control blade loads at or below design load scenarios. Exceeding the load for which a blade is designed is undesirable as the excessive load may decrease comfort or cause nicks, cuts, or other injuries during shaving. The “design load” can be defined as a force applied to the blade whereby the location of greatest stress intensity and magnitude is desirably located at the shoulder of the blade versus its tip during contact. Forces applied to a blade at or below the design load result in more load support coming from the blade’s shoulder (e.g., located at about 1 micrometer or less from the ultimate tip) as opposed to intense concentration of stress at the sharp tip when design load is exceeded.

A thicker coating on a second blade 16 as described herein, changes the shape as shown, and affects the design load such that the design load of the first blade 14 is lower than the design load of the second blade 16. Accordingly, the first blade 14 having a thinner coating than a second blade 16 may be deemed to be more sensitive to conditions of higher load, such as nicks and cuts, than the second blade when the load is exceeded. The blades of different coating thicknesses can be arranged to ensure that, by position in the cartridge, the desired design load compliance is maintained. For instance, the second blade of the present invention having a thicker coating may be considered a “skin-safe” type blade providing comfort, skin management and less nicks and cuts versus a first blade having a coating of reduced thickness as compared to the second blade and which, may be required to optimally cut hair more closely and efficiently. Accordingly, the first blade is desirably arranged to be closer to the front of the cartridge (nearer or nearest to the guard structure) than the second blade.

Plots 300 and 320 depict blades shaving at design loads modeled at the same scale for the first and second blades 14, 16, respectively, of the present invention. The stress in the substrate (e.g., skin) 305 resulting from the blade contact is illustrated by contours 302 with generally darker areas 307 indicating a greater stress, and lighter areas 314 indicating less stress. As can be seen in plot 300, the resulting distribution of stress from the first blade 14 contacting the substrate at design load includes a stress concentration 301 at the tip of the blade 306 and stress concentration 307 at a bevel or shoulder area 308. Stress concentrations from blade 14 in plot 300 are indicated by dark areas with tightly arranged contours at the tip 306 of the blade and at the shoulder area 308. These areas generally occur where the blade profile’s curvature changes the most in contact with substrate 305. Similarly blade 16 in plot 320 depicts contours 302 with stress concentrations 303 at the tip 316 and stress concentration 309 at the shoulder area 318. When comparing the second blade 16 to the first blade 14, the magnitudes of stress concentration at the tips 306 and 316 and the shoulders 308 and 318 of the first blade 14 and second blade 16, respectively, are generally smaller or lower for the second blade than for the first blade 14. Accordingly, at their respective design loads, the first blade 14 has a bit more stress on the substrate 305 than the second blade 16. However, at their respective design loads, both blades 14 and 16, as shown in plots 300 and 320, have a higher magnitude of stress concentration at the shoulders 308 and 318 than at the tips 306 and 316. Thus, at or below the design load, it is desirable, as shown in plots 300 and 320 to have most or all of the stress distributed at the shoulder and away from the tip.

It follows that, when the design load is exceeded, the first blade 14 will still have more stress on the substrate than the second blade 16 resulting from different coatings (e.g., different coating thicknesses). Plots 310 and 330 illustrate shaving loads exceeding desired design levels and show how the first and second blades of the present invention contact the substrate (e.g., skin). It is noted that the stress at design load scenarios of plots 300 and 320 is less than the stress in the exceeding design load scenarios of plots 310 and 330. As above, the blades’ contact with the substrate (e.g., skin) 305 are illustrated by contours 302 and generally darker areas of more tightly arranged contours like area 311 at the blade tip 306, and area 317 at the blade’s shoulder 308 of blade 14 which indicate regions with greater magnitude and concentration of stress. Similarly, concentrations of stress 313 and 319 from blade 16 in contact with substrate 305 are occurring at the tip 316 and shoulder 318 respectively. As can be seen in plot 310, the stress of the first blade 14 upon the substrate 305 when exceeding the design load includes stress 311 at the tip 306 of the blade and stress 317 at a bevel or shoulder area 308. Likewise, in plot 330 the stress of the second blade 16 upon the substrate 305 when exceeding the design load includes stress concentration 313 at the tip 316 and stress concentration 319 at the shoulder 318. However, in the scenarios where the design load has been exceeded as in both plots 310 and 330 it can be observed that the magnitude and concentration of stress is greater at the tips 306 and 316 than at the shoulders 308 and 318 of both blades 14 and 16 respectively. When the design loads of both blades 14 and 16 have been exceed as in both plots 310 and 330 the stress is concentrated with greater intensity and magnitude at the tips 306 and 316 than at the shoulders 308 and 318. Exceeding the design load concentrates a higher magnitude of stress at the tips 306 and 316 than at the shoulders 308 and 318 and is undesirable as the high intensity of stress at the tip may decrease comfort or cause nicks, cuts, or other injuries during shaving.

Plots 310 and 330 also show a bulge area 315 of the substrate (e.g., skin) in an area to the left of the blade tips in the diagram. This bulge area is not pronounced in plots 300 and 300. The bulge area 315 generally is a response of the substrate to the excessive load being put on the substrate by the blades, whether it be the first or second blade. As this bulge is in front of the blade leading its direction of travel while shaving, it is generally desirable to minimize the bulge area 315 to avoid discomfort, nicks, cuts, or other undesirable effects from shaving.

As shown in plots 310 and 330, when at the same load, which in these plots exceeds design load, the first blade 14 has more stress on a substrate both at the tip and the shoulder than the second blade 16. When design load is exceeded, it is desirable to have less stress at the tip.

Desirably, stress is distributed evenly both at the tip and shoulder at or below design load whereas stress is more likely to be distributed at the tip when design load is exceeded with some stress at shoulder. More desirably, stress is distributed to support the skin at the shoulder in a way that the tip does not exceed a failure stress of the skin.

Figure 30:
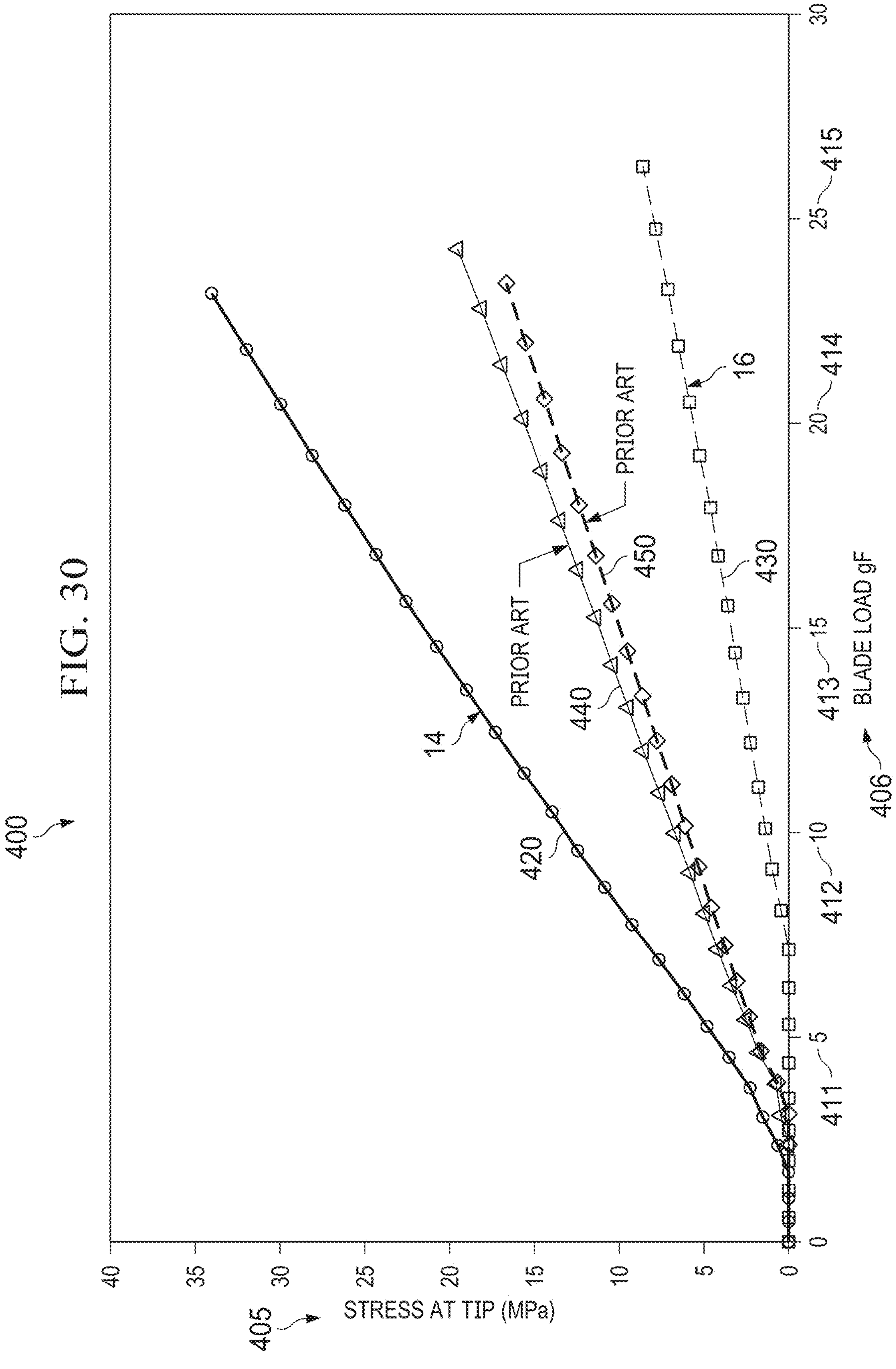
FIG. 30 is a graph showing skin stress as a function of individual blade load of the present invention.

Turning now to FIG. 30, a graph 400 of skin stress from a blade tip 405 as a function of blade load 406 values, e.g., 411, 412, 413, 414, 415 of a representative razor cartridge (e.g., FIG. 25) is depicted. Shavers in the act of using a razor apply a force through the handle to the cartridge on the surface being shaved. This force varies by the shaver's preference for balancing closeness and comfort. Generally, the load applied by shavers can be in the range of about 50 gram-Force (gF) to about 1000 gram-Force (gF). Cartridges are designed to distribute some of this shaving load over the blades. Individual forces on the blade or blades result from this load distribution.

As shown by stress areas described supra, the loads on each blade generally increase from the first blade closest or closer to the guard being a minimum to a maximum on the second blade closest or closer to the cap than the guard. Individual blades loads can generally be in the range of about 0 gF to about 25 gF for average shaving loads (e.g., about 250 gF to about 375 gF).

Blade tip and edge designs, driven by the thickness of the coating of the present invention, provide a balance of cutting action and skin management properties in a razor cartridge. The blade load and thickness of the coating affect the stress exerted on the surface being shaved. As shown in graph 400 of FIG. 30, a range of stress is exerted on the shaved surface results when all blade loads are considered.

In FIG. 30, the first blade 14 of the present invention, having a thinner coating, optimized to achieve a substantial amount of the cutting action, represented by curve 420, exerts more stress as a function of blade load than the second blade 16, which has a thicker coating optimized to achieve substantial skin management properties, represented by curve 430 and exerts less stress as a function of blade load.

Thus, while the first blade 14 exerts more stress, it can be positioned in the cartridge such that the load on the first blade is controlled below a threshold of discomfort. The second blade exerts less stress overall as a function of load and can be positioned in the cartridge to accommodate higher loading as desired for closeness. In the present invention, the first blade is positioned closer or closest to the guard structure and the second blade is positioned close or closest to the cap structure).

This graph indicates that, under high blade load values such as at 413, 414, and 415, a second blade may be desirable since the second blade type (e.g., thicker coating) has less skin stress under the blade tip. It may also follow that under lower blade load values such as 411 or 412 of graph 400, the first blade 14 of the present invention, may be selected.

Prior art curves 440 and 450 represent the stress upon two different prior art blades such as those found in commercial Gillette razors.

The prior art curves are based on two blades of prior art cartridges where one blade in the razor cartridge closer or closest to the cap does not have a thicker coating than that of another blade closer or closest to the guard. It is noted that blade tip stresses in FIG. 30 of both the first blade 14 and the second blade 16 of the present invention fall well outside the prior art curves 440 and 450 for prior art blades. This can be attributed to the second blade having a thicker coating than that of the first blade.

Figure 31:
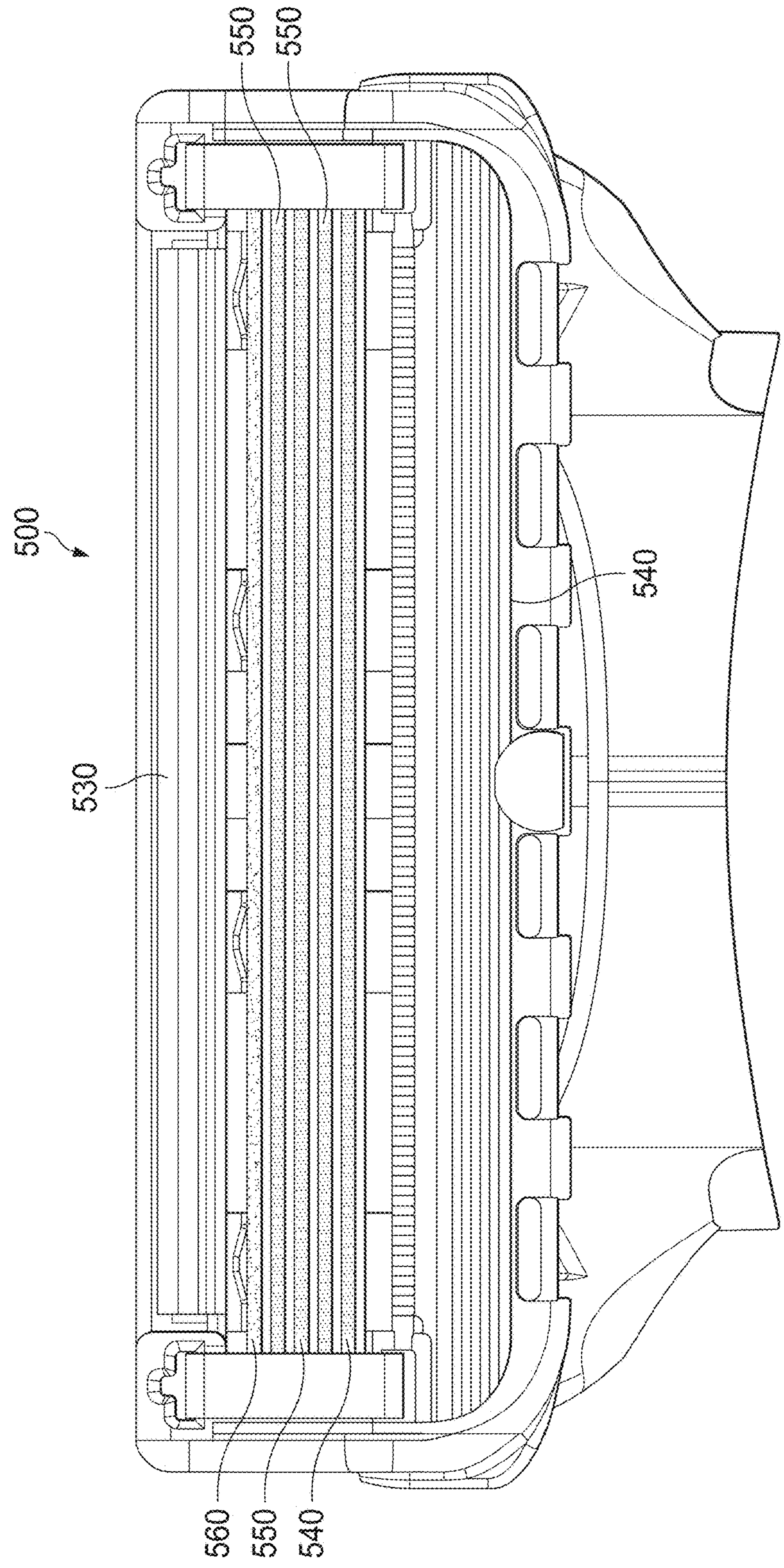
FIG. 31 is a razor cartridge of the present invention showing colored blades representing first and second blades.

The present invention contemplates that the first blade 14 and the second blade 16 may also comprise different colors to distinguish their thicknesses. For instance, the first blade may be a blue colored blade and the second blade may be of no additional color (e.g., steel colored) or any different color other than the blue color of the first blade, such as green or gold or even a light hue of blue. The third blades of the present invention may also be any color, whether the same or different than that of the second blade. In this way, a user may be able to recognize a type of cartridge based on the colors of the blades as arranged in the cartridges. For instance, a color arrangement of the present invention with blade thicknesses based on any of the embodiments described or that feasibly could be arranged is possible. Thus, the cartridge 500 having a guard 540 and a cap 530, representative of the thickness arrangement of the embodiment of FIG. 7, may have four blue blades as shown in FIG. 31, as the color for the first blade 540 is and all third blades 550 in the first four blade positions and a gray color for the second blade 560 in the fifth blade position. These cartridges with different colored blades may be deemed to have recognizable attributes or be touted as such, e.g., an "efficient," a "comfort" cartridge or a "sensitive" cartridge for a user.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor cartridge comprising:

a first blade proximal to a front of said cartridge, said first blade comprising a first substrate having a first thickness dimension, said first substrate having one or more first coatings disposed thereon, said first coatings having an overall first thickness of all coating layers;

a second blade proximal to a back of said cartridge, said second blade comprising a second substrate having a second thickness dimension that is the same as said first thickness dimension, said second substrate having one or more second coatings disposed thereon, said second coatings having an overall second thickness of all coating layers, wherein the overall first thickness is less than the overall second thickness.

2. The razor cartridge of claim 1 wherein said one or more first coatings is a first hard coating.

3. The razor cartridge of claim 1 wherein said one or more second coatings is a hard coating.

4. The razor cartridge of claim 1 wherein said front of said cartridge comprises a guard area and said back of said cartridge comprises a cap area.

5. The razor cartridge of claim 4 wherein said first blade is adjacent to said guard area.

6. The razor cartridge of claim 4 wherein said second blade is adjacent to said cap area.

7. The razor cartridge of claim 1 wherein the overall second thickness is at least two times as thick as the overall first thickness.

8. A razor cartridge comprising a first razor blade having a first substrate having a first thickness dimension and a first hard coating thereon having an overall first thickness of all coating layers, a second razor blade having a second substrate having a second thickness dimension that is the same as the first thickness dimension and a second hard coating thereon having an overall second thickness of all coating layers, said first blade disposed closer to a guard area of said razor cartridge than said second blade and said second blade disposed closer to a cap area of said razor cartridge than said first blade, wherein said overall second thickness is greater than said overall first thickness.

9. The razor cartridge of claim 8 wherein said first hard coating or said second hard coating comprises a carbon containing material, chromium containing material, niobium containing material, boron containing material, and titanium containing material, or any combination thereof.

10. The razor cartridge of claim 8 wherein said first razor blade is adjacent to said guard area.

11. The razor cartridge of claim 8 wherein said second razor blade is adjacent to said cap area.

12. The razor cartridge of claim 8 further comprising at least one third razor blade having at least one third hard coating having an overall third thickness, said at least one third razor blade disposed between said first razor blade and said second razor blade.

13. The razor cartridge of claim 12 wherein said at least one third hard coating is substantially the same as the first hard coating.

14. The razor cartridge of claim 12 wherein said at least one third hard coating is substantially the same as the second hard coating.

15. The razor cartridge of claim 8 wherein said overall second thickness is at least two times as thick as said overall first thickness.

16. The razor cartridge of claim 8 wherein the overall first thickness ranges in thickness less than about 800 Angstroms and the overall second thickness is greater than about 800 Angstroms.

17. A razor cartridge comprising a plurality of razor blades disposed within said cartridge from a front area to a back area of said razor cartridge, each of said blades comprising a substrate with a coating, each substrate having the same thickness dimension, wherein an overall thickness of all coating layers of said coating of each of said blades increases from said front area to said back area.

* * * * *